(12) United States Patent
Nagata et al.

(10) Patent No.: US 8,325,406 B2
(45) Date of Patent: Dec. 4, 2012

(54) PLANAR LIGHTING APPARATUS AND LIQUID CRYSTAL DISPLAY DEVICE USING THE SAME

(75) Inventors: Takayuki Nagata, Osaka (JP); Tatsuo Itoh, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 12/526,182

(22) PCT Filed: Feb. 5, 2008

(86) PCT No.: PCT/JP2008/000141
§ 371 (c)(1),
(2), (4) Date: Aug. 6, 2009

(87) PCT Pub. No.: WO2008/099581
PCT Pub. Date: Aug. 21, 2008

(65) Prior Publication Data
US 2010/0321612 A1  Dec. 23, 2010

(30) Foreign Application Priority Data
Feb. 8, 2007  (JP) .................................. 2007-028903

(51) Int. Cl.
*G02F 1/1335* (2006.01)
(52) U.S. Cl. ................... 359/204.1; 359/202.1; 359/17; 359/18; 349/62; 347/225; 347/243
(58) Field of Classification Search ............ 349/62; 356/447; 359/204.1, 202.1
See application file for complete search history.

(56) References Cited

U.S. PATENT DOCUMENTS

| | | | |
|---|---|---|---|
| 5,200,766 A | 4/1993 | Iwasaki | |
| 5,715,078 A * | 2/1998 | Shiraishi | 359/204.1 |
| 6,864,627 B2 * | 3/2005 | Komoto et al. | 313/503 |
| 6,874,893 B2 * | 4/2005 | Park | 353/84 |
| 7,726,828 B2 * | 6/2010 | Sato | 362/97.3 |
| 2001/0013976 A1 * | 8/2001 | Hirayama et al. | 359/599 |
| 2001/0019479 A1 * | 9/2001 | Nakabayashi et al. | 362/31 |
| 2005/0036028 A1 * | 2/2005 | Yoshida | 347/238 |

(Continued)

FOREIGN PATENT DOCUMENTS

JP  3-261909  11/1991

(Continued)

OTHER PUBLICATIONS

International Search Report issued May 27, 2008 in the International (PCT) Application No. PCT/JP2008/000141.

*Primary Examiner* — Edward Glick
*Assistant Examiner* — Sang Nguyen
(74) *Attorney, Agent, or Firm* — Wenderoth, Lind & Ponack, L.L.P.

(57) ABSTRACT

Provided is a planar lighting apparatus performing a display (i) without luminance nonuniformity, (ii) with a specified luminance distribution in a scanning direction and (iii) having a high luminance and a large area. Also provided is a liquid crystal display device using the planar lighting apparatus. In the plan lighting apparatus, a scanning light quantity of a scanning light 13 to a light guide section 15 is controlled by a controller 20, so at to emit an outgoing light 16 from a principal surface 17 with a specified luminance distribution in a scanning direction 21 of the scanning light 13.

13 Claims, 25 Drawing Sheets

U.S. PATENT DOCUMENTS

| | | | |
|---|---|---|---|
| 2005/0276566 A1* | 12/2005 | Iimura | 385/146 |
| 2007/0091404 A1* | 4/2007 | Miyamoto | 359/204 |
| 2007/0159448 A1* | 7/2007 | Inuzuka et al. | 345/102 |
| 2008/0225299 A1* | 9/2008 | Ono | 356/447 |
| 2009/0109683 A1 | 4/2009 | Miyashita | |
| 2010/0220261 A1* | 9/2010 | Mizushima et al. | 349/64 |

FOREIGN PATENT DOCUMENTS

| | | | |
|---|---|---|---|
| JP | 6-148635 | | 5/1994 |
| JP | 06-148635 | * | 5/1994 |
| JP | 2000-81847 | | 3/2000 |
| JP | 2006-155964 | | 6/2006 |

* cited by examiner

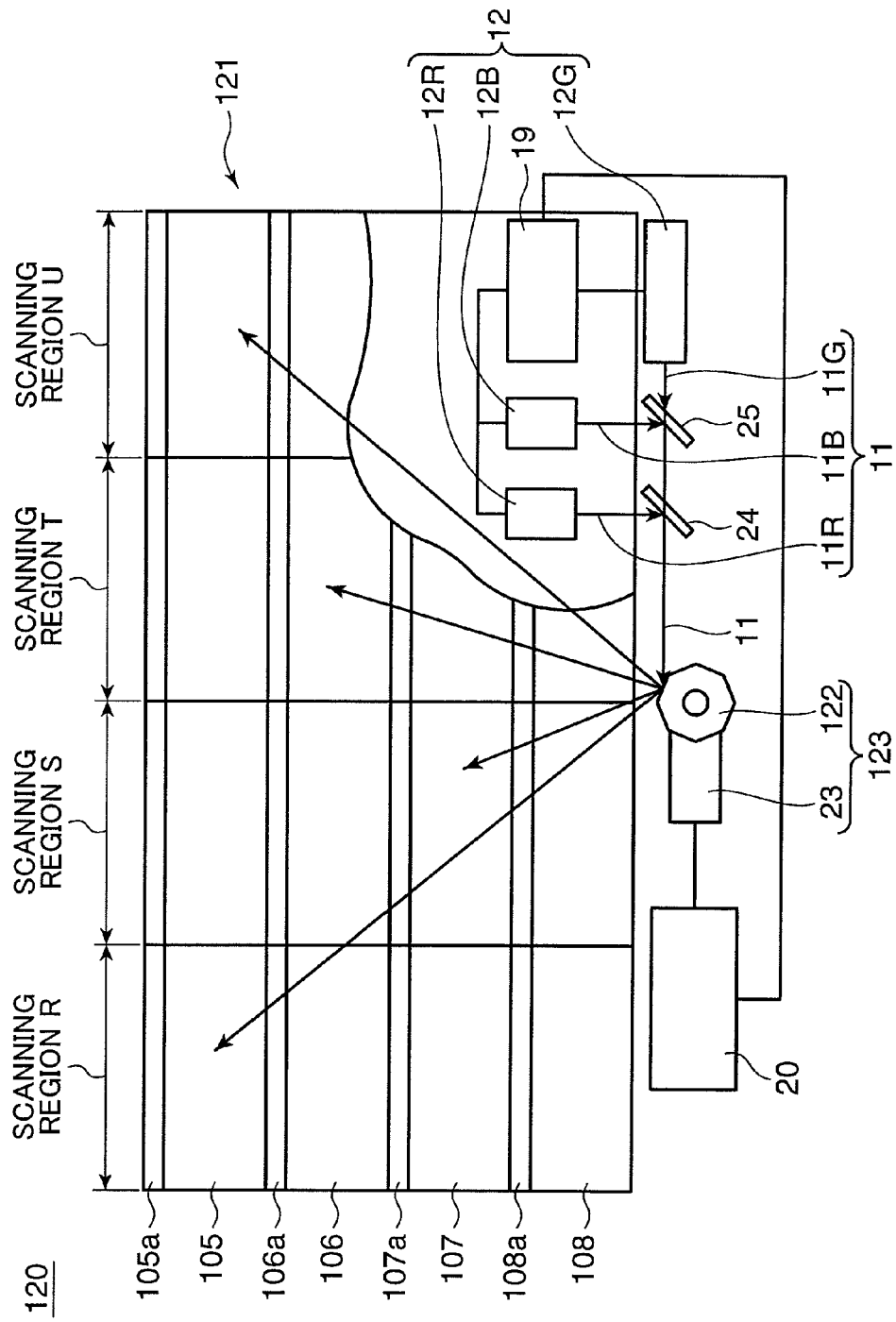

PLANAR LIGHTING APPARATUS AND LIQUID CRYSTAL DISPLAY DEVICE USING THE SAME

FIELD OF THE INVENTION

The present invention relates to a planar lighting apparatus using laser light as a light source and a liquid crystal display device using the same.

DESCRIPTION OF THE BACKGROUND ART

A planar lighting apparatus is used as backlight illumination in a liquid crystal display device used in a display panel or the like. In the above planar lighting apparatus, a discharge tube, light-emitting diodes (LEDs) and the like are generally used as a light source. Upon using the above planar lighting apparatus in a large-size display or the like, it is required to output light with high luminance and strong chromaticity. There is also required elaboration to make luminance uniform by uniformly irradiating light from the light source to a display panel surface to eliminate luminance nonuniformity on the entire display panel surface.

In recent years, study on the utilization of three laser light sources of red light (R light), green light (G light) and blue light (B light) has been started to obtain light with high luminance and strong chromaticity as a light source of a display device. As an exemplary construction for planarly emitting light from these laser light sources, the R, G and B light are combined into one laser light, which is then scanned by a polygon minor and reflected using a flat reflecting mirror (see, for example, patent literature 1). If the polygon mirror is used, scanning speed differs between end parts and a central part of a scanning range and this scanning speed difference increases as a scanning angle increases. The above scanning speed difference causes luminance nonuniformity, but the scanning speed is improved to be constant using an fθ lens in patent literature 1.

Another known planar lighting apparatus is such that light emitting elements such as LEDs are arranged on a side surface of a light guide plate and luminous fluxes from these LEDs are incident on the side surface of the light guide plate and reflected upward of the light guide plate (see, for example, patent literature 2). In patent literature 2, luminance nonuniformity is reduced by elaborating the shapes of a multitude of prisms provided on the lower surface of the light guide plate. Specifically, the directions or angles of inclination of slants of the prisms formed on the light guide plate at the incident side of the luminous fluxes change depending on the positions of the luminous fluxes on the incident surface. Alternatively, the prisms are formed such that the slants, valley lines or ridge lines thereof are concave with respect to the incident surface of the luminance fluxes.

Speed variation caused by the scanning of the polygon mirror is eliminated using the fθ lens in patent literature 1. If the fθ lens is used, the scanning angle of the polygon mirror cannot be increased, wherefore a distance between the polygon mirror and the fθ lens needs to be largely increased to cause a problem of enlarging the display device. Since an fθ lens needs to be accordingly enlarged in a large-size display, there is a problem of being extremely expensive.

In patent literature 2, a construction for improving the luminance nonuniformity to a sufficient level for the use as an illumination light source of a display device is not elucidated although it is indicated that the luminance nonuniformity of the planar lighting apparatus is improved. Accordingly, there is a problem of not elucidating a construction for obtaining sufficient luminance in a large-size display by a light guide plate method using LEDs as light sources.

[Patent Literature 1]
Japanese Unexamined Patent Publication No. H06-148635
[Patent Literature 2]
Japanese Unexamined Patent Publication No. 2006-155964

SUMMARY OF THE DISCLOSURE

In order to solve the above problems, an object of the present invention is to provide a planar lighting apparatus which has high luminance, is free from luminance nonuniformity and can be thinned and a liquid crystal display device using the same.

In order to accomplish the above object, one aspect of the present invention is directed to a planar lighting apparatus, comprising a laser light source for emitting laser light; a light guide plate having an incident surface on which the laser light is to be incident and a principal surface from which the laser light incident on the incident surface is emitted; a scanning unit for scanning the incident surface with the laser light emitted from the laser light source; and a controller for controlling the laser light source, wherein the controller controls the light quantity of the laser light scanning the incident surface such that the ongoing light from the principal surface forms a specified luminance distribution in a scanning direction of the laser light by the scanning unit.

Another aspect of the present invention is directed to a planar lighting apparatus, comprising a laser light source for emitting laser light; a light guide plate having an incident surface on which the laser light is to be incident and a principal surface from which the laser light incident on the incident surface is emitted; and a scanning unit for scanning the incident surface with the laser light emitted from the laser light source, wherein the scanning unit includes a polygon mirror having a plurality of mirror surfaces and a driver for driving the polygon mirror; the incident surface is divided beforehand by a plurality of scanning regions arranged in a scanning direction of the laser light by the scanning unit; and each mirror of the polygon mirror scans any one of the respective scanning regions with the laser light.

According to the present invention, there can be provided a planar lighting apparatus which has high luminance, is free from luminance nonuniformity and can be thinned and a liquid crystal display device using such a planar lighting apparatus.

BRIEF DESCRIPTION OF THE DRAWINGS

FIG. 25 is a schematic construction diagram of a planar lighting apparatus according to a sixth embodiment of the invention.

BEST MODES FOR EMBODYING THE INVENTION

Figure 1:
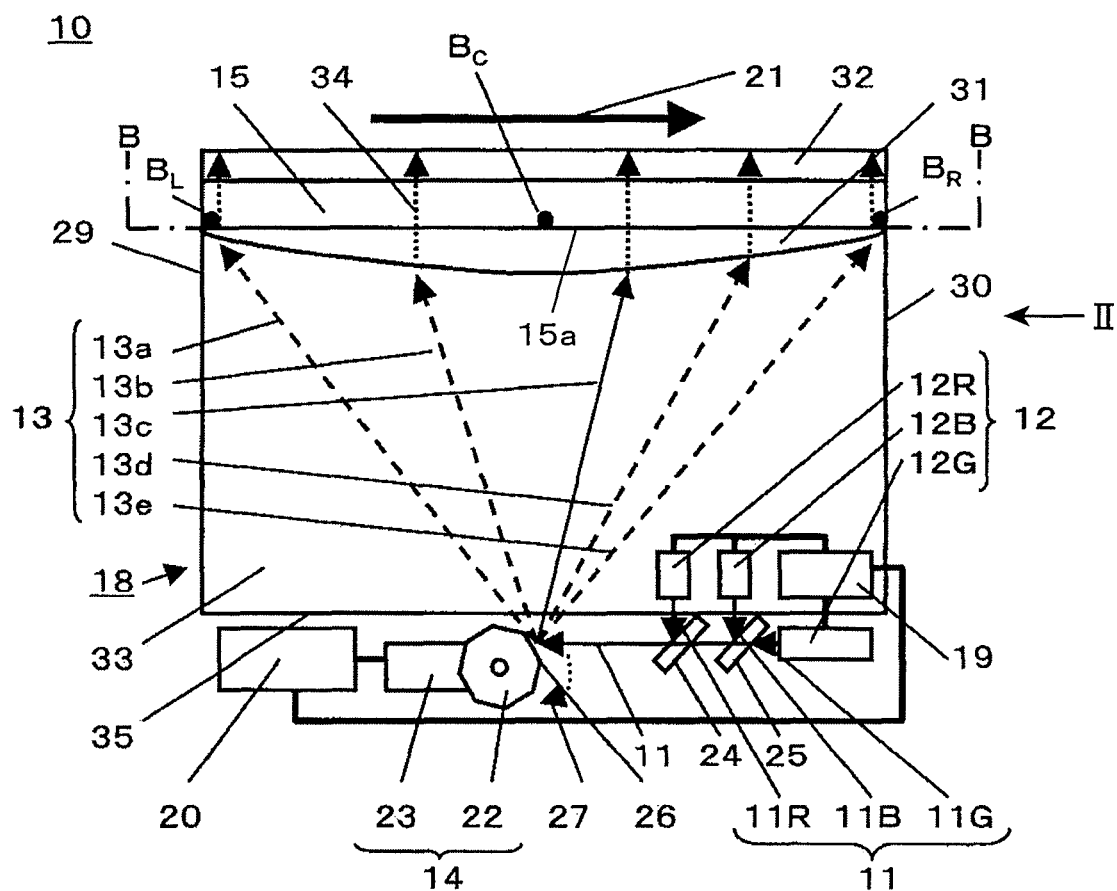
FIG. 1 is a schematic construction diagram of a planar lighting apparatus according to a first embodiment of the present invention when viewed from behind.

Hereinafter, embodiments of the present invention are described with reference to the drawings. The same elements are identified by the same reference numerals and may not be repeatedly described in some cases. The following embodiments are specific examples of the present invention and not of the nature to limit the technical scope of the present invention.

(First Embodiment)

Figure 2:
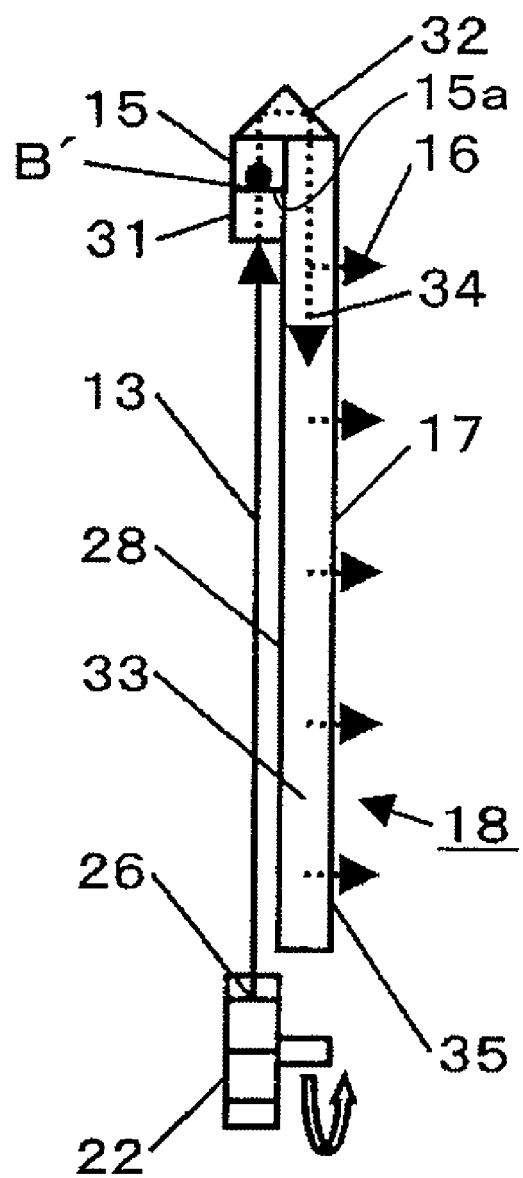
FIG. 2 is a diagram showing a lateral construction when a principal part of the planar lighting apparatus of FIG. 1 is viewed in a direction of arrow II.

FIGS. 1 to 4 show a planar lighting apparatus according to a first embodiment of the present invention. FIG. 1 is a schematic construction diagram of the planar lighting apparatus according to the first embodiment when viewed from behind, and FIG. 2 is a diagram showing a lateral construction when a principal part of the planar lighting apparatus of FIG. 1 is viewed in a direction II.

As shown in FIGS. 1 and 2, a planar lighting apparatus 10 of the first embodiment is provided with laser light sources 12, dichroic mirrors 24, 25, a scanning unit 14, a light guide plate 18 for emitting light incident from a light guide section 15 from a principal surface 17, a power supply 19 for the laser light sources 12, and a controller 20 for controlling the power supply 19 and the scanning unit 14.

The laser light sources 12 include a red laser light source (R light source) 12R, a green laser light source (G light source) 12G and a blue laser light source (B light source) 12B.

The dichroic mirrors 24, 25 combine red laser light (R light) 11R, green laser light (G light) 11G and blue laser light (B light) 11B emitted from the respective laser light sources 12R, 12G, 12B and guide laser light 11 to the scanning unit 14.

The scanning unit 14 includes a polygon mirror 22 and a driver 23 for the polygon mirror 22. The polygon mirror 22 has flat mirror surfaces 26, for example, as outer surfaces of an octagonal prism. The scanning unit 14 reflects the laser light 11 using the respective mirror surfaces 26 as the polygon mirror is driven and rotated, and scans a scanning surface 15a of the light guide section 15 with this reflected light as scanning light 13.

The scanning light 13 reflected by the polygon mirror 22 is introduced to the light guide section 15 and propagates as scanning light 34 while being bent in a direction perpendicular to a scanning direction 21 by a cylindrical lens 31 as shown in FIGS. 1 and 2.

As shown in FIG. 2, the light guide plate 18 includes a plate main body 33, the light guide section 15 and a connecting section 32 for optically connecting the plate main body 33 and the light guide section 15. Deflecting grooves or scattering elements for deflecting the scanning light 34 propagating in the plate main body 33 toward the light guide plate 17 are formed in or on a rear surface 28 of the plate main body 33. The deflecting grooves are serrated grooves for deflecting the scanning light 34 by totally reflecting it using the slants of the grooves.

The controller 20 is so constructed as to control a scanning light quantity according to the scanning speed of the scanning light 13 with respect to the light guide section 15. The laser light 11 may be a CW light or a pulse light.

Next, the operation of the planar lighting apparatus constructed as above is described with reference to FIG. 1. The R light 11R, G light 11G and B light 11B emitted from the R light source 12R, G light source 12G and B light source 12B are combined into one laser light 11 as RGB light by the dichroic mirrors 24, 25. This laser light 11 is reflected by the mirror surfaces 26 of the polygon mirror 22 and becomes the scanning light 13 for scanning the incident surface 15a by the rotation of the polygon mirror 22.

Here, the scanning light 13 is scanned in order of scanning beams 13a, 13b, 13c, 13d and 13e along the scanning direction 21 as a direction from a left end 29 toward a right end 30 of the light guide plate 18 when the polygon mirror 22 is rotated in a direction of arrow 27.

Figure 3:
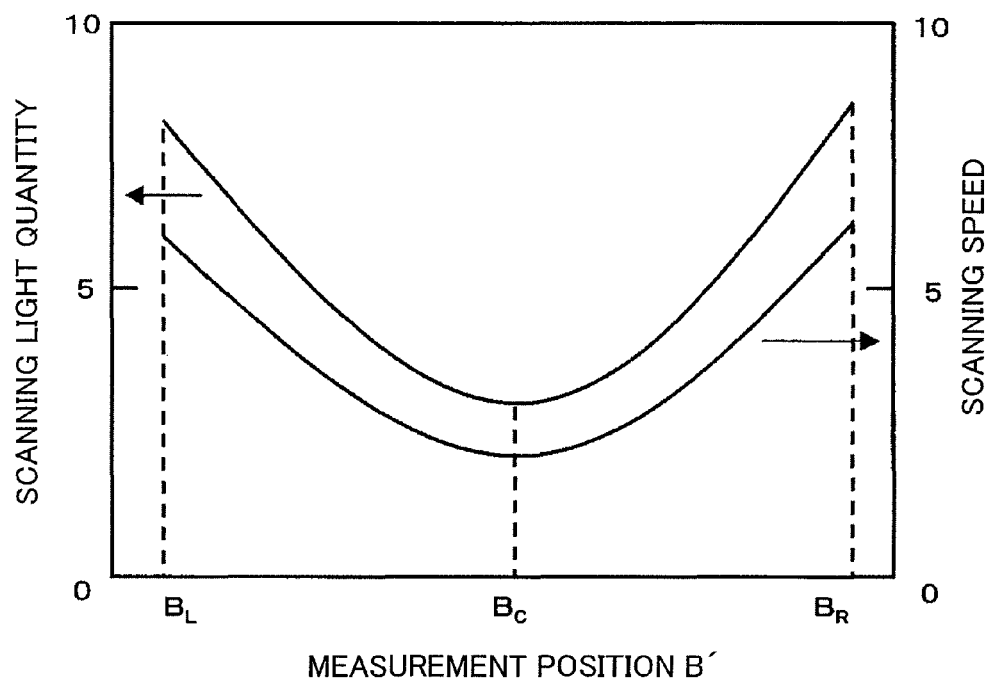
FIG. 3 is a graph showing scanning light quantity, scanning speed of scanning light and a ratio of these at measurement positions B' on a cross section along B-B of FIG. 1 to show changes of the scanning light quantity and the scanning speed with respect to the measurement positions.
Figure 4:
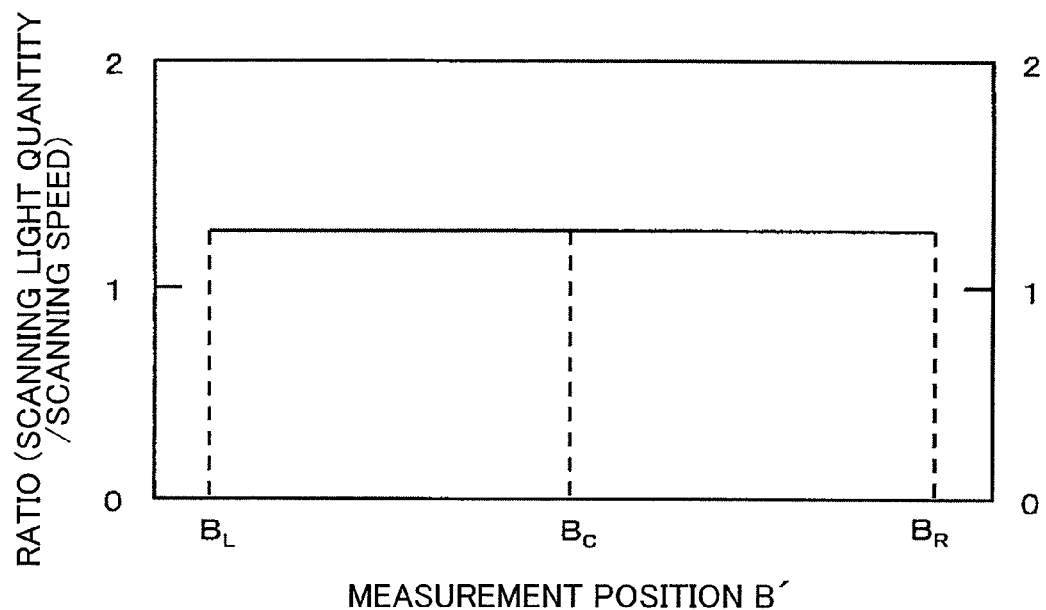
FIG. 4 is a graph showing the ratio of the scanning light quantity and the scanning speed with respect to the measurement positions.

FIG. 3 is a graph showing changes of the scanning light quantity and scanning speed of the scanning light 34 at measurement positions B' of the light guide section 15 on a cross section along B-B of FIG. 1, and FIG. 4 is a graph showing a ratio of the scanning light quantity and the scanning speed at the measurement positions B', wherein the scanning light quantity and the scanning speed are expressed in arbitrary units.

When the polygon mirror 22 is rotated at a constant speed in FIG. 1, the scanning light 13 is scanned at a constant angular velocity. Thus, the scanning speed on the cross section along B-B varies along a curve as shown in FIG. 3. In other words, the scanning speed on the cross section along B-B varies in such a manner as to be maximized at measurement positions BL, BR respectively near the left end 29 and right end 30 of the light guide plate 18 while being minimized in a central part BC between the measurement positions BL and BR.

Here, the controller 20 according to the first embodiment adjusts the scanning light quantity such that the ratio of the scanning speed and the scanning light quantity at the measurement positions B' is constant as shown in FIG. 4 by controlling the power supply 19 for the laser light sources 12 according to the scanning speed. By executing such a control, the quantity of light incident on the light guide section 15 per unit area in the scanning direction is made uniform.

The scanning light 34 introduced to the light guide section 15 is reflected by 180° by the connecting section 32, for example, in the form of a bar-shaped prism, introduced to the plate main body 33, and deflected in the plate main body 33 to be emitted from the principal surface 17 as outgoing light 16.

The planar lighting apparatus 10 constructed as above can realize a uniform luminance distribution in the scanning direction by controlling the scanning light quantity of the scanning light to be introduced to the light guide section 15 according to the scanning speed.

Although the scanning light quantity is so controlled as to make the luminance distribution uniform in the first embodiment shown in FIGS. 1 to 4, it is also possible to execute such a control as to obtain a specified luminance distribution.

For example, since viewpoints are concentrated near the center of a screen in a large-screen display device, it can be ignored in many cases even if luminance at an end of the screen is slightly reduced, wherefore power consumption can be reduced by setting luminance in left and right end parts lower than luminance in a central part.

Figure 5:
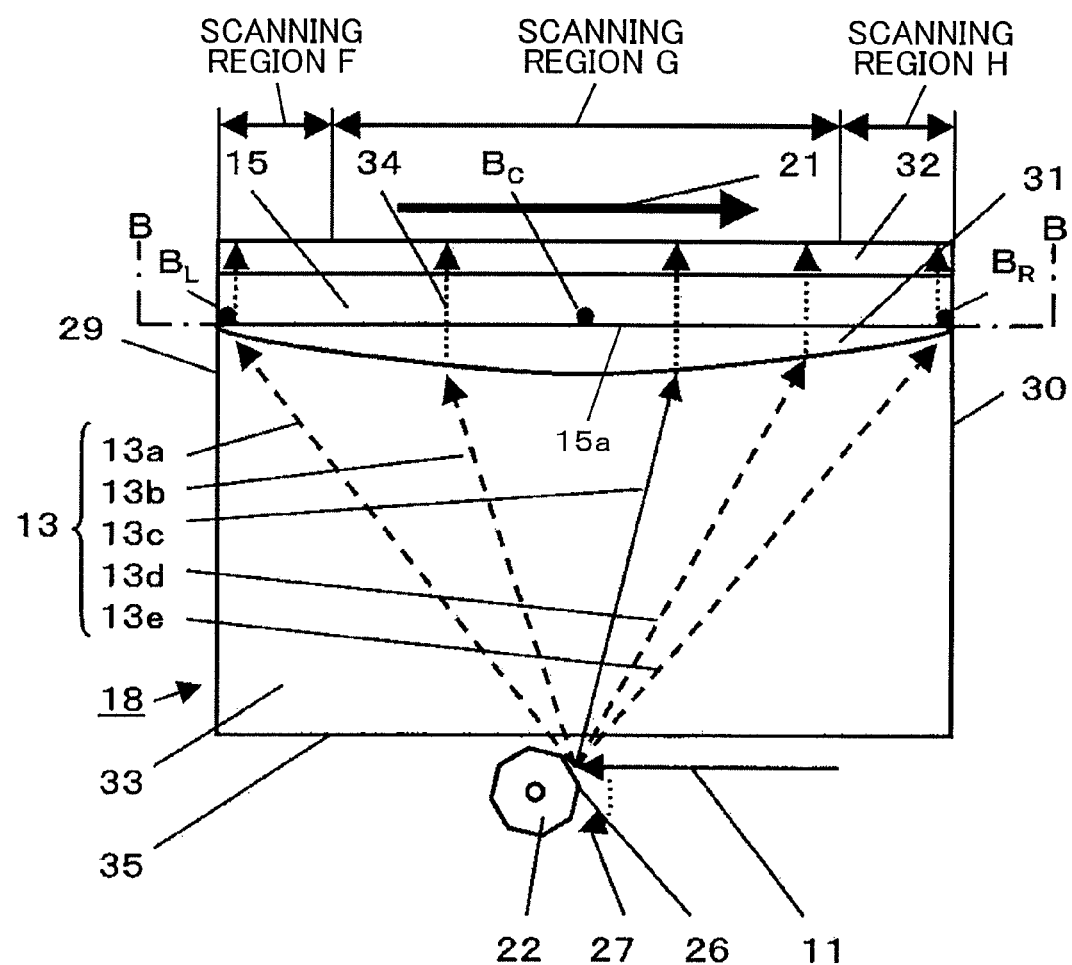
FIG. 5 is a schematic construction diagram showing the operation of an essential portion of the planar lighting apparatus according to the first embodiment of the invention.
Figure 6:
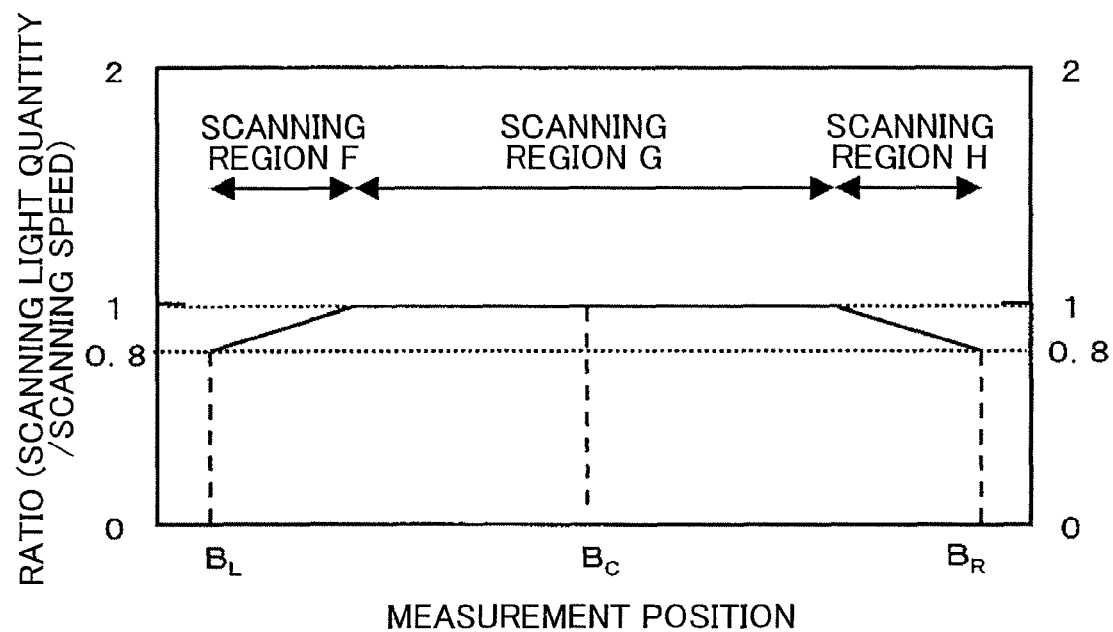
FIG. 6 is a graph showing a ratio of the scanning light quantity and the scanning speed with respect to the measurement positions.

FIGS. 5 and 6 are a diagram and a graph showing the operation in the case of setting the luminance in the left and right end parts lower in this way. FIG. 5 is a schematic construction diagram showing the operation of an essential portion of the planar lighting apparatus 10 and FIG. 6 shows a ratio of the scanning light quantity and the scanning speed with respect to the measurement positions B'. Here, the scanning light quantity and the scanning speed are expressed in arbitrary units. In FIGS. 5 and 6, a central part, a left end part and a right end part in the scanning direction are respectively referred to as scanning regions G, F and H.

If the scanning light quantity is controlled such that the ratio of the scanning speed and the scanning light quantity in the scanning regions F, H decreases with distance from the scanning region G in the central part as shown in FIG. 6, such a luminance distribution as if the luminance in the left and right end parts are naturally reduced can be obtained. In this example, a control is executed such that the ratio of the scanning speed and the scanning light quantity at the measurement positions BL, BR is about 0.8-fold of the ratio in the scanning region G in the central part.

Also in the case where, for example, an aspect ratio of a display image differs from that of a display device, power consumption can be reduced by partially reducing luminance by providing a scanning region where the light source is turned off.

Figure 7:
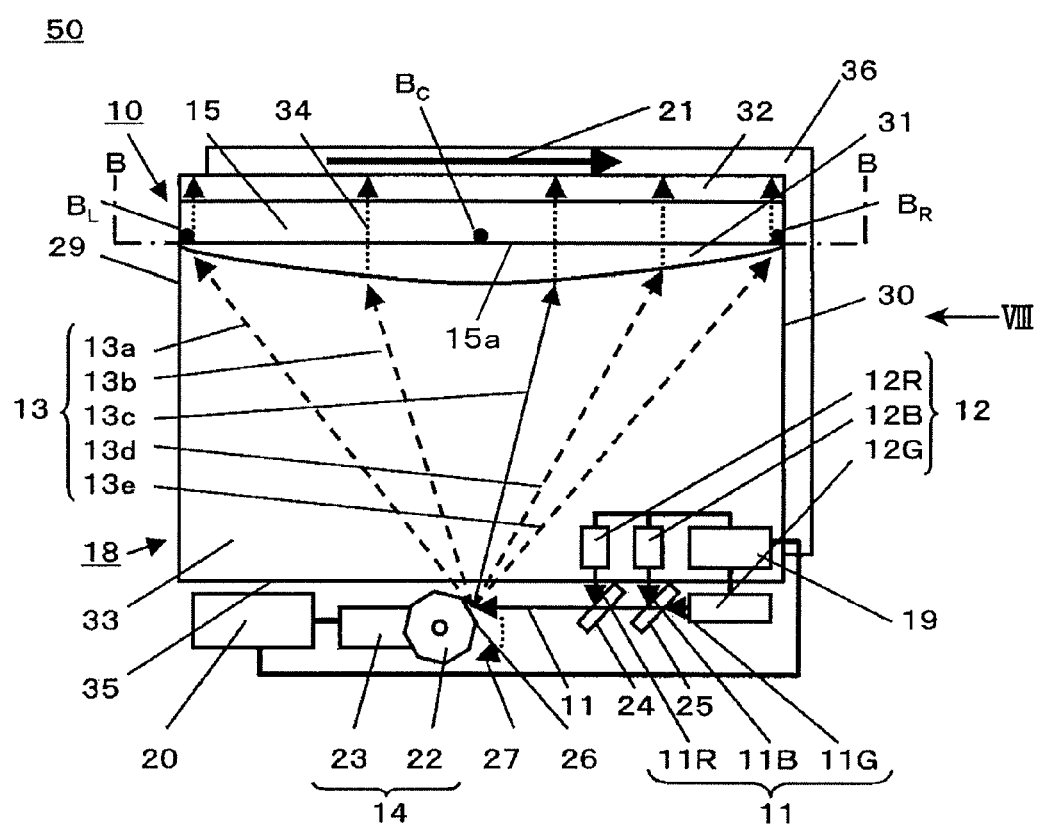
FIG. 7 is a diagram showing a schematic construction of a liquid crystal display device according to the first embodiment of the invention.
Figure 8:
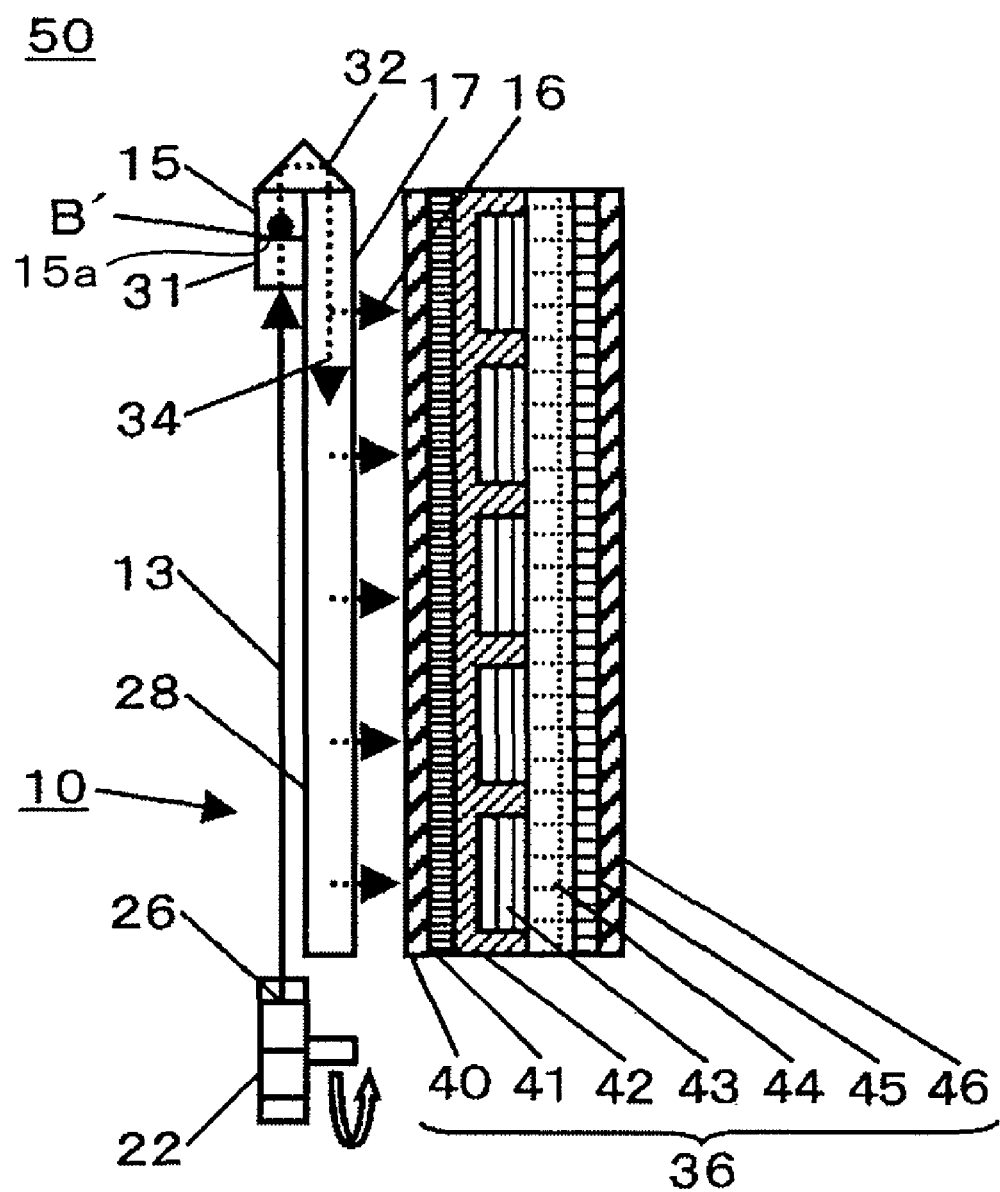
FIG. 8 is a diagram showing a lateral construction when a principal part of the planar lighting apparatus of FIG. 7 is viewed in a direction of arrow VIII.

FIGS. 7 and 8 are schematic construction diagrams of a liquid crystal display device 50 using the planar lighting apparatus 10 of FIGS. 1 and 2 as a backlight illumination apparatus. FIG. 7 is a diagram showing a schematic construction of the liquid crystal display device 50 and FIG. 8 is a diagram showing a schematic construction of the liquid crystal display device 50 of FIG. 7 when viewed from a direction VIII with a liquid crystal display panel 36 shown in a schematic section.

As shown in FIGS. 7 and 8, the liquid crystal display device 50 is provided with the liquid crystal display panel 36 and the planar lighting apparatus 10 shown in FIG. 1 and uses the planar lighting apparatus 10 as a backlight apparatus for irradiating the liquid crystal display panel 36 from behind.

In this liquid crystal display device 50, outgoing light 16 emitted from the planar lighting apparatus 10 successively passes through a polarizing plate 40 and a glass plate 41 of the liquid crystal display panel 36, further passes through a color filter 44, a glass plate 45 and a polarizing plate 46 after being modulated by a liquid crystal 42 and RGB pixels 43, and is displayed as an image on the liquid crystal display device 50.

The liquid crystal display device of this embodiment constructed as above can have a wide color reproduction range, a thin construction and higher luminance by using lasers as light sources of the planar lighting apparatus. Since uniform illumination free from luminance nonuniformity or illumination with a specified luminance distribution is possible by backlight illumination using the planar lighting apparatus 10, high image quality and low power consumption can be realized.

Since no 10 lens is used unlike the conventional construction, it is possible to construct the liquid crystal display device from inexpensive parts. For example, if a Fresnel lens made of resin is used as the cylindrical lens, even a long one can be inexpensively formed.

Further, since no fθ lens is used, the polygon mirror 22 having a large scanning angle can be used and the light guide section 15 of the light guide plate 18 and the polygon mirror 22 can be brought closer than in the conventional construction. In this way, the polygon minor 22 can be arranged without largely projecting from the light guide plate 18 and the planar lighting apparatus 10 and the liquid crystal display device 50 having a small projected area can be realized.

Although the polygon mirror 22 is used as the scanning unit 14 for reflecting the laser light 11 to generate the scanning light 13 in the first embodiment, similar effects can be obtained even if a galvanometer mirror is used to construct the scanning unit.

Although the cylindrical lens is used to cause the scanning light 13 to be incident on the light guide section 15 perpendicularly to the scanning direction 21 in the first embodiment, the scanning light 13 may be caused to be perpendicularly incident on the light guide section 15 using a toric lens, a Fresnel lens or a diffractive optical element.

Further, a light source for emitting at least red, green and blue light may be used as the laser light source of the backlight illumination apparatus.

(Second Embodiment)

Figure 9:
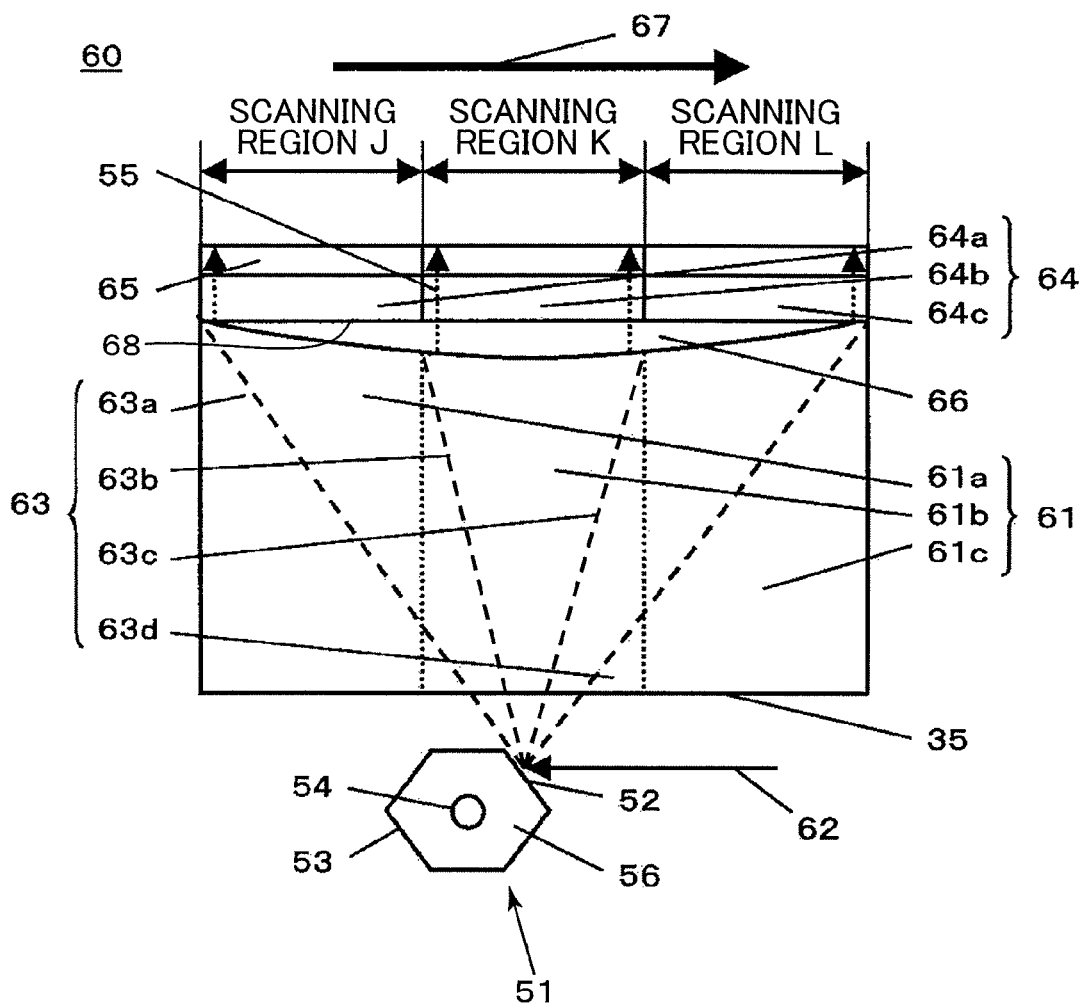
FIG. 9 is a schematic construction diagram showing a planar lighting apparatus according to a second embodiment of the invention when viewed from behind.
Figure 10:
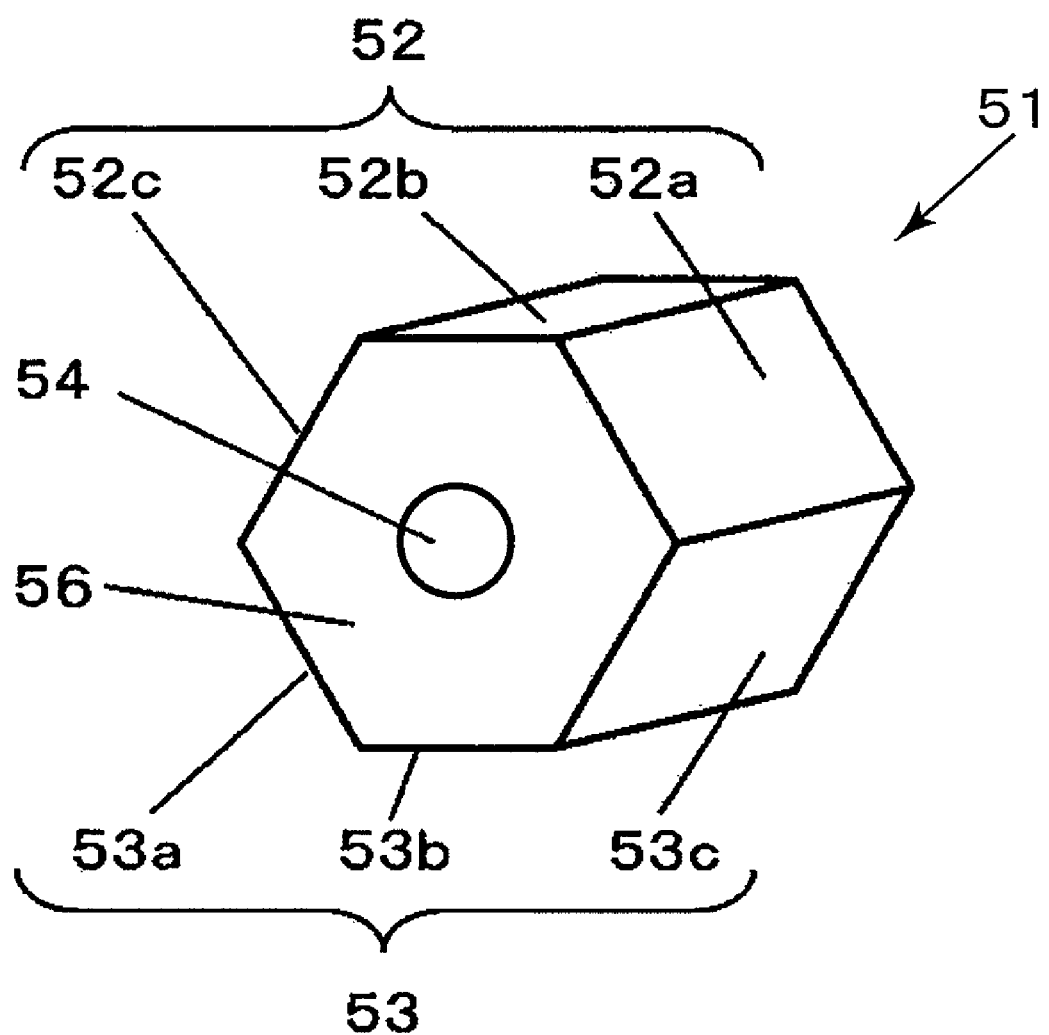
FIG. 10 is a schematic perspective view showing the configuration of a polygon mirror used in the planar lighting apparatus of FIG. 9.
Figure 11:
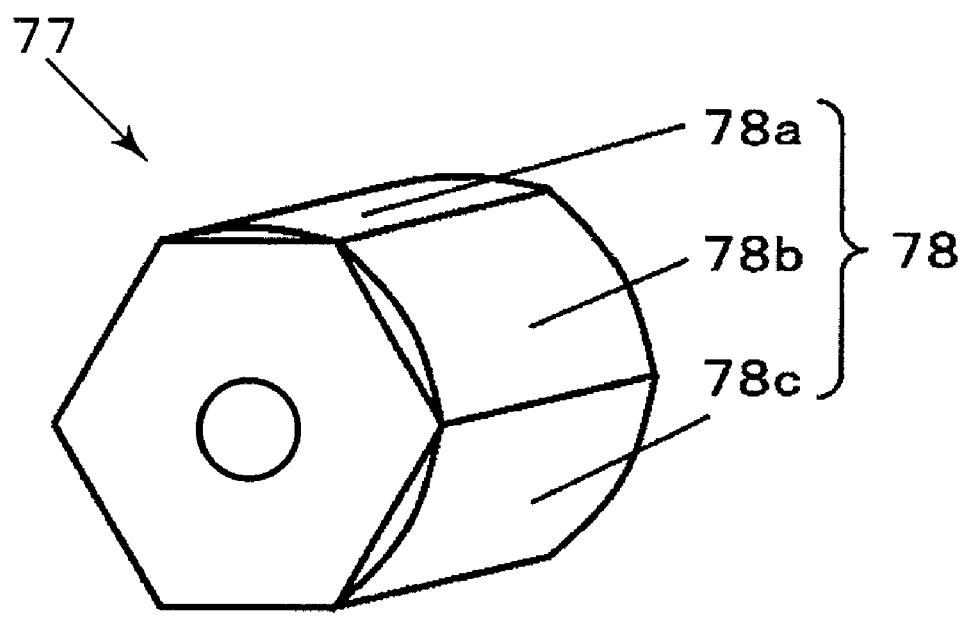
FIG. 11 is a schematic perspective view showing the construction of a polygon mirror different from that of FIG. 10.

FIGS. 9 and 10 show a planar lighting apparatus 60 according to a second embodiment of the present invention and a polygon mirror 51 used in the planar lighting apparatus 60. FIG. 9 is a schematic construction diagram of the planar lighting apparatus 60 when viewed from behind. FIG. 10 is a schematic perspective view showing the configuration of mirror surfaces of the polygon mirror 51 used in the planar lighting apparatus 60. FIG. 11 is a schematic perspective view of another embodiment of the polygon mirror 51.

As shown in FIG. 9, the planar lighting apparatus 60 is provided with a light guide plate, a laser light source (not shown) for emitting laser light 62 and the polygon mirror 51.

The light guide plate includes a plate main body 61, a light guide section 64 and a connecting section 65 for optically connecting the plate main body 61 and the light guide section 64.

The plate main body 61 is divided into three regions, i.e. a left emission region 61a, a central emission region 61b and a right emission region 61c in a scanning direction 67.

The light guide section 64 is divided into a left light guide section 64a for introducing scanning light 63 to the left emission region 61a, a central light guide section 64b for introducing the scanning light 63 to the central light guide section 61b and a right light guide section 64c for introducing the scanning light 63 to the right emission region 61c. Further, the light guide section 64 has an incident surface 68, on which laser light is incident.

As shown in FIG. 10, the polygon mirror 51 includes a mirror main body 56 and a rotary shaft 54 provided at a center of gravity position of this mirror main body 56. Since the rotary shaft 54 is provided at the center of gravity position of the mirror main body 56 in this way, the polygon mirror 51 can be stably rotated at a high speed.

The mirror main body 56 is in the form of a hexagonal prism having mirror surfaces 52a, 52b, 52c, 53a, 53b and 53c. The scanning light 63 respectively scanned by these mirror surfaces 51a to 52c, 53a to 53c is incident on any one of three partial light guide sections 64a, 64b and 64c. For example, the scanning light reflected by the mirror surfaces 52a, 53a is incident on the partial light guide section 64a, the one reflected by the mirror surfaces 52b, 53b is incident on the partial light guide section 64b and the one reflected by the mirror surfaces 52c, 53c is incident on the partial light guide section 64c.

In the planar lighting apparatus 60 thus constructed, the scanning light 63 reflected by the respective mirror surfaces 52, 53 of the polygon mirror 51 is reflected by a cylindrical lens 66 to propagate in a direction perpendicular to the scanning direction 67, thereby scanning the incident surface 68. Here, the scanning light 63 scans ranges of the incident surface 68 corresponding to scanning regions J, K and L corresponding to the mirror surfaces 52, 53. In other words, the mirror surfaces 52a, 53a correspond to the range of the incident surface 68 corresponding to the scanning region J and cause the scanning light between scanning light 63a and 63b to be incident on the left light guide section 64c. The mirror surfaces 52b, 53b correspond to the range of the incident surface 68 corresponding to the scanning region K and cause the scanning light between scanning light 63b and 63c to be incident on the central light guide section 64b. The mirror surfaces 52c, 53c correspond to the range of the incident surface 68 corresponding to the scanning region L and cause the scanning light between scanning light 63c and 63d to be incident on the right light guide section 64c.

Light propagating as scanning light 55 after being introduced to the light guide section 64 is reflected by the connecting section 65, propagates in the plate main body 61 and is emitted from a principal surface (not shown).

By employing such a construction, speed variation in each scanning region can be reduced and luminance nonuniformity can be reduced as a whole since the scanning angle per mirror surface can be made smaller. If the scanning light quantity is simultaneously controlled using a construction such as the controller 20 in the first embodiment described above, luminance can be made more uniform.

The scanning angle of the polygon mirror with six surfaces is normally 120° and the scanning angles of the respective minor surfaces need to be reduced in order to realize the construction of FIG. 9. This can be realized, for example, by turning the laser light 62 off at the edge portions of the polygon minor 51 to turn it on only in the necessary scanning regions.

Alternatively, the scanning angle can be reduced by forming the respective minor surfaces into curved surfaces as shown in FIG. 11. FIG. 11 shows a polygon minor 77 with minor surfaces 78 which are partial cylindrical surfaces. In a polygon minor with six surfaces, a scanning angle is 120° if the minor surfaces are flat. On the other hand, if the mirror surfaces are partial cylindrical surfaces, a scanning angle is 0° if a center of curvature and an axis of rotation coincide. Thus, a desired scanning angle can be obtained by forming the minor surfaces by partial cylindrical surfaces or partial elliptic cylindrical surfaces and setting the curvature to a suitable value.

Although the light guide section 64 is divided into three sections in this embodiment, the ends of the respective scanning regions may slightly overlap without being clearly divided. In this way, luminance nonuniformity at the boundaries of the respective scanning regions can be reduced.

Figure 12:
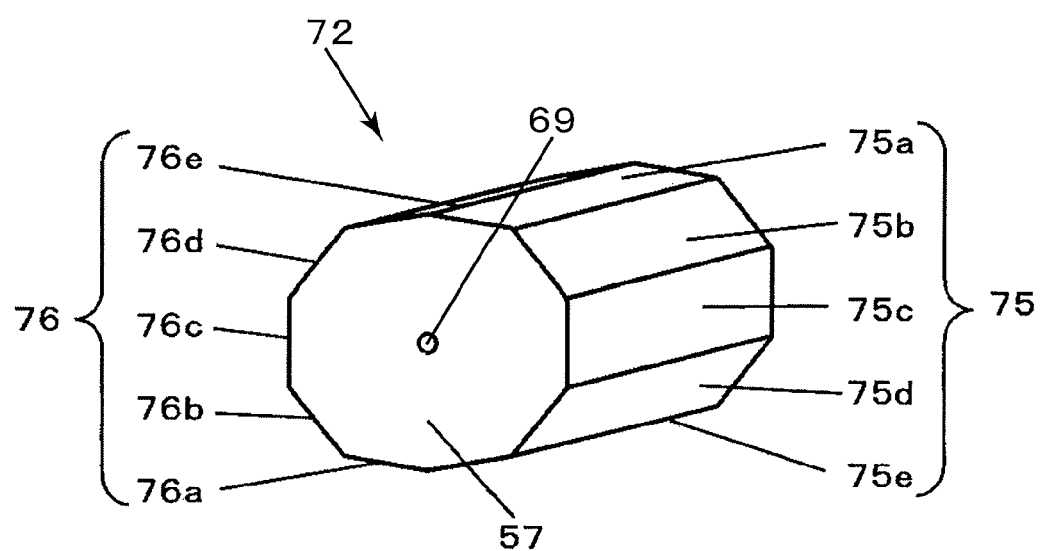
FIG. 12 is a schematic perspective view showing the configuration of a polygon mirror used in the planar lighting apparatus according to the second embodiment of the invention.
Figure 13:
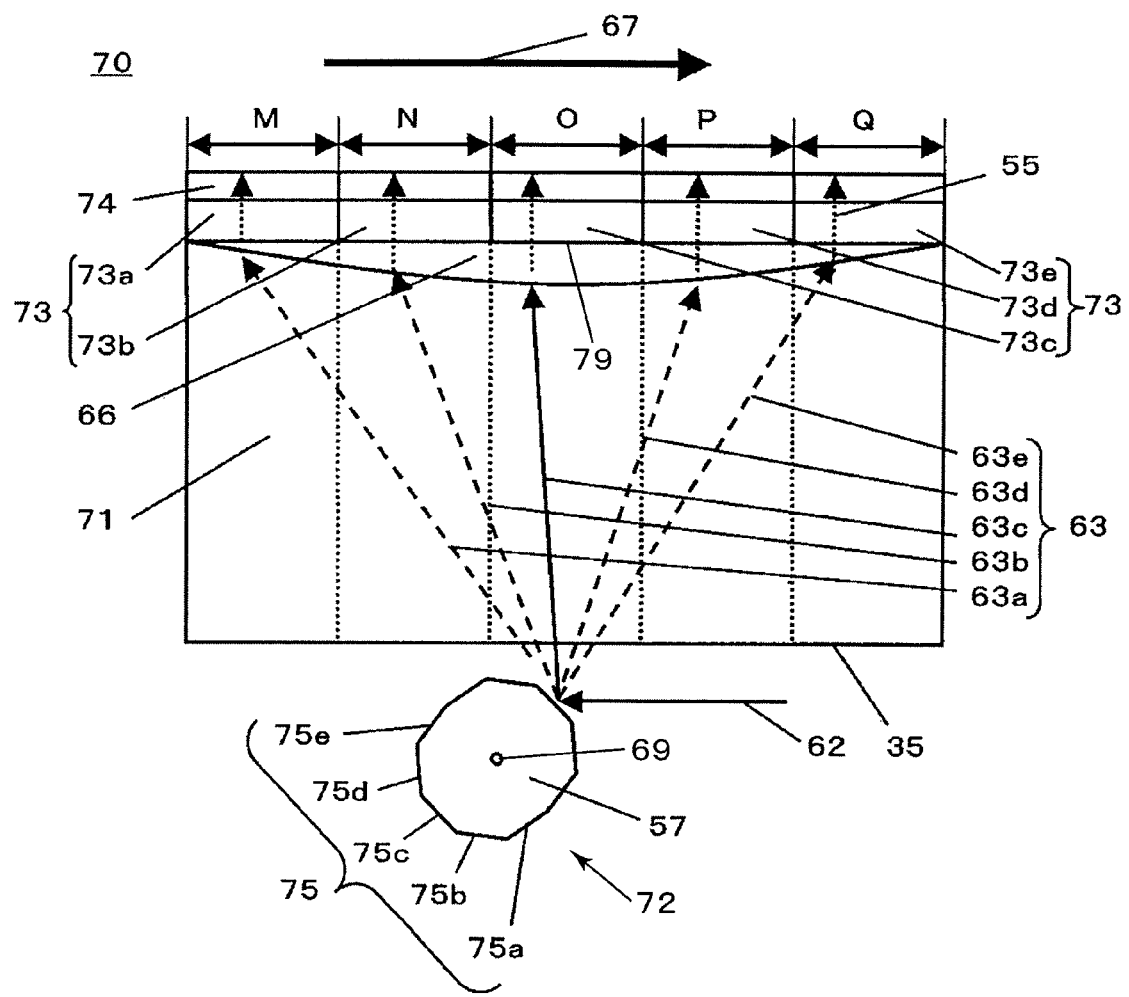
FIG. 13 is a schematic construction diagram showing a planar lighting apparatus according to the second embodiment of the invention when viewed from behind.

FIGS. 12 and 13 show a planar lighting apparatus 70 and a polygon minor 72 used in the planar lighting apparatus 70 according to another embodiment different from those shown in FIGS. 9 to 11. FIG. 12 is a schematic perspective view showing the configuration of minor surfaces of the polygon minor 72 used in the planar lighting apparatus 70. FIG. 13 is a schematic construction diagram showing the planar lighting apparatus 70 when viewed from behind.

As shown in FIG. 13, the planar lighting apparatus 70 is provided with a light guide plate, a laser light source (not shown) for irradiating laser light 62 and the polygon minor 72.

The light guide plate includes a plate main body 71, a light guide section 73 and a connecting section 74 for optically connecting these plate main body 71 and light guide section 73.

The plate main body 71 is divided into five regions, i.e. scanning regions M, N, O, P and Q. The light guide section 73 is divided into five partial light guide sections 73a, 73b, 73c, 73d and 73e corresponding to the scanning regions M, N, O, P and Q. Further, the light guide section 73 has an incident surface 79, on which laser light is to be incident.

As shown in FIGS. 12 and 13, the polygon mirror 72 includes a mirror main body 57 and a rotary shaft 69 provided at a center of gravity position of this minor main body 57. Since the rotary shaft 69 is provided at the center of gravity position of the mirror main body 57 in this way, the polygon mirror 72 can be stably rotated at a high speed.

The mirror main body 57 has a polygonal shape with a nearly elliptic cross section perpendicular to the rotary shaft 69. Specifically, in this embodiment, the cross sectional shape of the polygon mirror 72 is decagonal and the outer side surfaces of this decagonal prism serve as mirror surfaces 75, 76.

The respective mirror surfaces 75, 76 are formed to cause scanning light 63 to be incident on different partial light guide sections 73. Specifically, in FIGS. 12 and 13, scanning light 63a scanned by the mirror surfaces 75a, 76a is incident on the partial light guide section 73a corresponding to the scanning region M. Scanning light 63b scanned by the mirror surfaces 75b, 76b is incident on the partial light guide section 73b corresponding to the scanning region N. Scanning light 63c scanned by the mirror surfaces 75c, 76c is incident on the partial light guide section 73c corresponding to the scanning region 0. Scanning light 63d scanned by the mirror surfaces 75d, 76d is incident on the partial light guide section 73d corresponding to the scanning region P. Scanning light 63e scanned by the mirror surfaces 75e, 76e is incident on the partial light guide section 73e corresponding to the scanning region Q.

In the planar lighting apparatus 70 thus constructed, the scanning light 63 reflected by the respective mirror surfaces 75, 76 of the polygon mirror 72 is reflected by a cylindrical lens 66 to propagate in a direction perpendicular to a scanning direction 67 and introduced to the light guide section 73. Here, the scanning light 63 scans ranges of the incident surface 79 corresponding to the scanning regions M, N, O, P and Q corresponding to the mirror surfaces 75, 76.

The laser light incident on the light guide section 73 is reflected as scanning light 55 by the connecting section 74, propagates in the light guide plate 71 and is emitted from a principal surface (not shown).

By increasing the number of the mirror surfaces 75, 76 of the polygon mirror 72 in this way, the scanning angle per mirror surface 75, 76 can be further reduced, wherefore it is possible to reduce speed variation in each scanning region and reduce luminance nonuniformity as a whole. If the scanning light quantity is simultaneously controlled using a construction such as the controller 20 in the first embodiment described above, luminance can be made more uniform.

By employing such a construction of setting the respective scanning regions such that the ends thereof slightly overlap without clearly dividing the light guide section 73, luminance nonuniformity at the boundaries between the respective scanning regions can be reduced as in the case shown in FIGS. 9 to 11.

The planar lighting apparatus of this embodiment constructed as described above can reduce luminance nonuniformity in the scanning direction by setting a plurality of scanning regions and reducing the scanning angles of the respective mirror surfaces to reduce speed variation.

(Third Embodiment)

Figure 14:
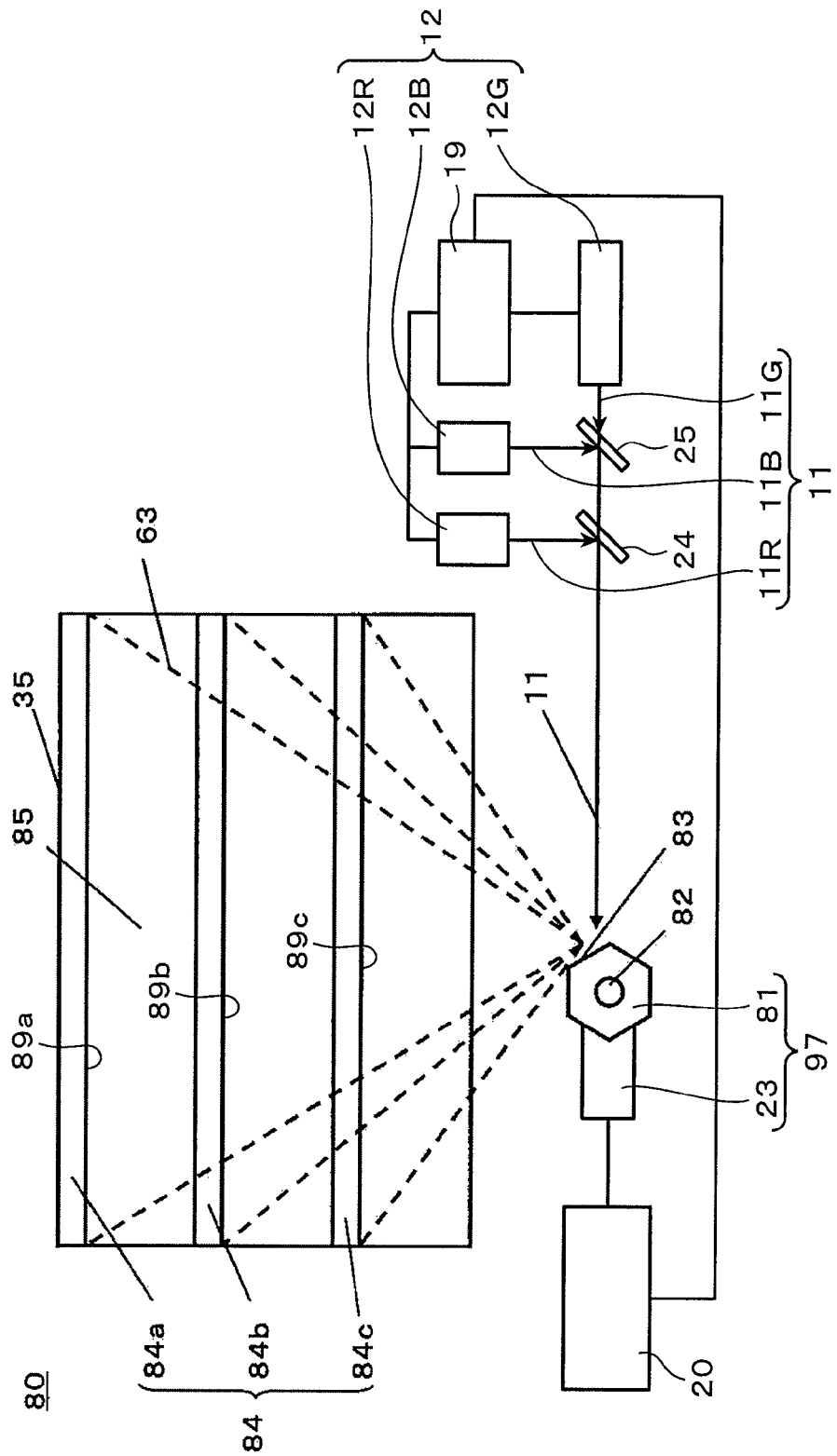
FIG. 14 is a schematic construction diagram showing a planar lighting apparatus according to a third embodiment of the invention when viewed from behind.
Figure 15:
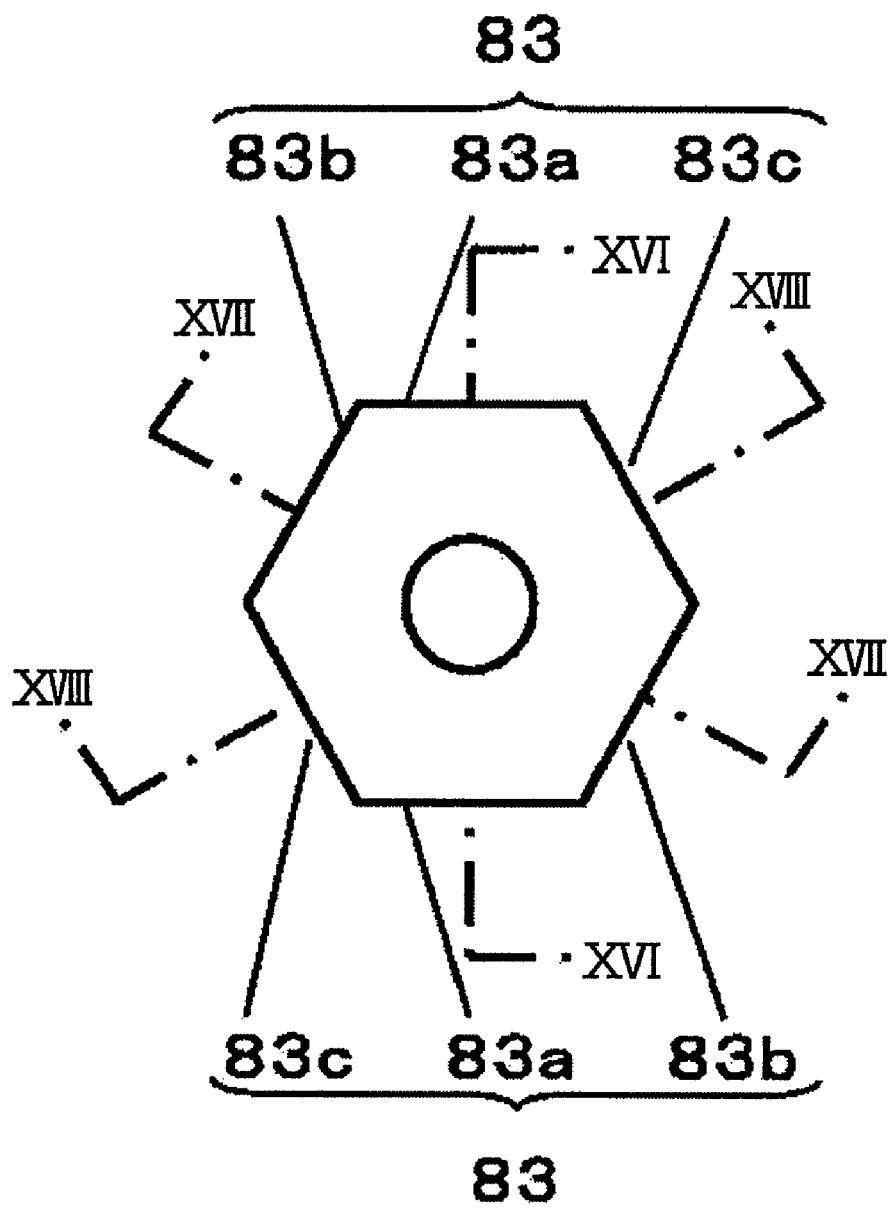
FIG. 15 is a diagram showing mirror surfaces of a polygon mirror of FIG. 14.
Figure 16:
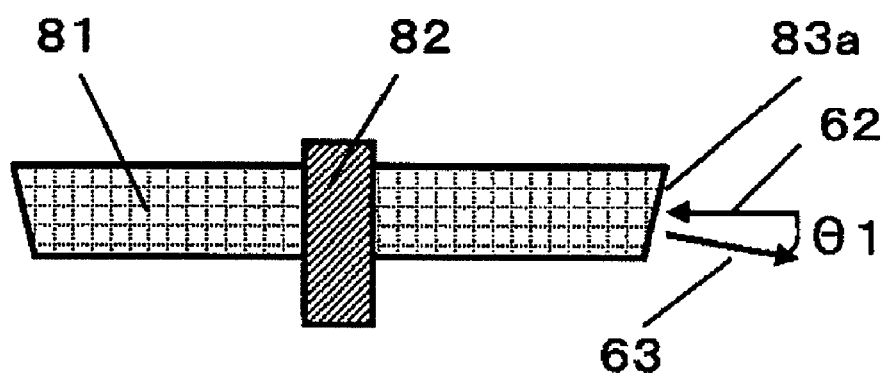
FIG. 16 is a section along XVI-XVI of FIG. 15.
Figure 17:
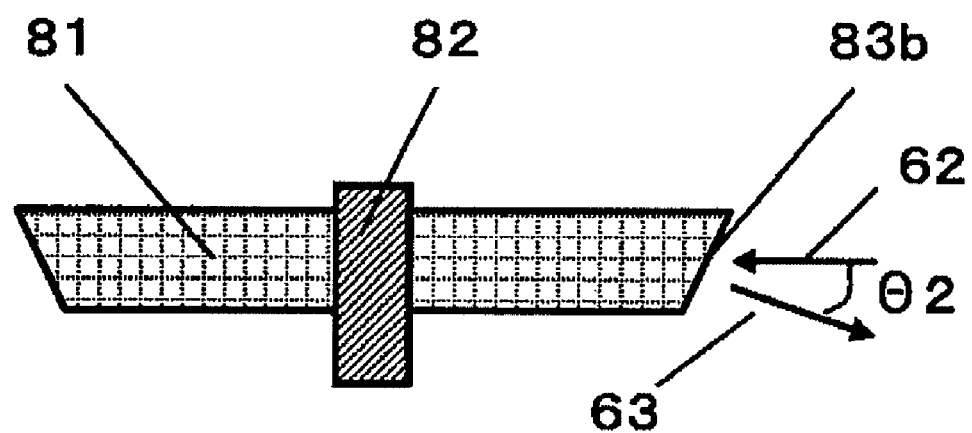
FIG. 17 is a section along XVII-XVII of FIG. 15.
Figure 18:
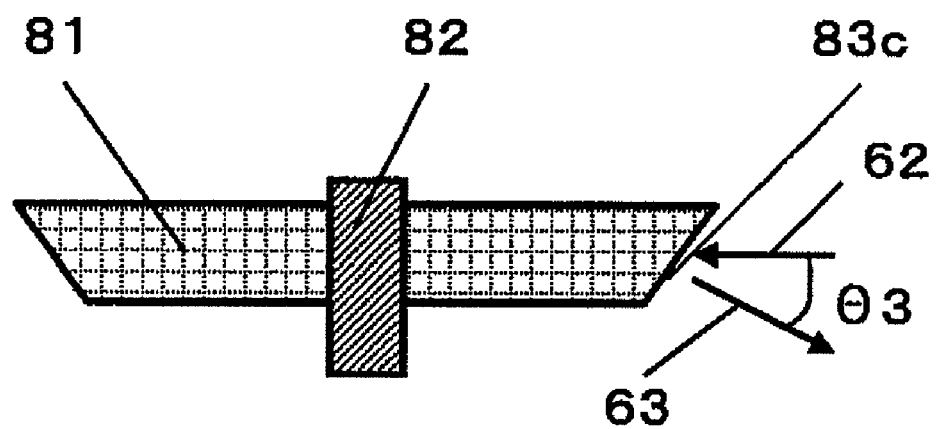
FIG. 18 is a section along XVIII-XVIII of FIG. 15.

FIGS. 14 to 18 show a planar lighting apparatus 80 according to a third embodiment of the present invention and a polygon minor 81 used in the planar lighting apparatus 80. FIG. 14 is a schematic construction diagram of the planar lighting apparatus 80 when viewed from behind, FIG. 15 is a diagram showing the configuration of mirror surfaces of the polygon mirror 81, FIG. 16 is a section along XV-XV of FIG. 15, FIG. 17 is a section along XVII-XVII of FIG. 15 and FIG. 18 is a section along XVIII-XVIII of FIG. 15.

As shown in FIG. 14, the planar lighting apparatus 80 is provided with the laser light source 12 for irradiating laser light 11, the dichroic mirrors 24, 25, a scanning unit 97, a light guide plate 85 and the power supply 19 for the laser light source 12.

The light guide plate 85 includes three rows of partial light guide sections 84 projecting from the rear surface of the light guide plate 85 and arranged in a direction orthogonal to a scanning direction by the polygon mirror 81. Specifically, the partial light guide sections 84 are an upper light guide section 84a, a central light guide section 84b and a lower light guide section 84c extending straight along longer sides 35 of the light guide plate 85. These light guide sections 84a to 84c are respectively formed with incident surfaces 89a to 89c for causing scanning light 63 to be incident on the light guide plate 85. In other words, the upper light guide section 84a is formed with an incident surface 89a, the central light guide section 84b is formed with an incident surface 89b and the lower light guide section 84c is formed with an incident surface 89c.

More specifically, the partial light guide sections 84 are in the form of roof-shaped projections when viewed sideways (projections as identified by reference numeral 91 in FIG. 22), and upper or lower surfaces of these projections closer to the polygon mirror 81 serve as the incident surfaces 89a to 89c. The laser light incident on the respective incident surfaces 89a to 89c is reflected downward by the surfaces of the projections distant from the polygon mirror 81 to propagate in the light guide plate 85.

The scanning unit 97 includes the polygon minor 81 and the driver 23 for driving the polygon minor 81.

As shown in FIGS. 15 to 18, the polygon mirror 81 has two each of minor surfaces 83a, 83b and 83c formed to be at different angles with respect to the rotary shaft 82. Angles of inclination of these minor surfaces 83a to 83c with respect to the rotary shaft 82 are set such that the scanning light 63 is reflected at different angles $\theta 1$, $\theta 2$ and $\theta 3$. In this embodiment, the reflecting angles $\theta 1$, $\theta 2$ and $\theta 3$ of the laser light 11 are in a relationship of $\theta 1 < \theta 2 < \theta 3$. As a result, the scanning light 63 reflected by the minor surface 83a is incident on the incident surface 89a of the upper light guide section 84a that is most distant. The scanning light 63 reflected by the minor surface 83b is incident on the incident surface 89b of the central light guide section 84b. The scanning light 63 reflected by the minor surface 83c is incident on the incident surface 89c of the lower light guide section 84c that is closest.

In the planar lighting apparatus 80 thus constructed, the scanning light 63 reflected by the respective minor surfaces 83a, 83b and 83c of the polygon minor 81 is incident on the light guide plate 85 through the corresponding light guide sections 84a, 84b and 84c, and the incident scanning light (not shown) propagates in the light guide plate and is emitted from a principal surface (not shown).

Since the planar lighting apparatus 80 of this embodiment constructed as described above can shorten a propagation distance of the scanning light in the light guide plate by causing the scanning light to be incident on the light guide plate from the light guide sections 84a to 84c located at three positions, luminance nonuniformity in the direction orthogonal to the scanning direction can be reduced.

Here, since distances from the respective partial light guide sections 84a to 84c to the polygon mirror 81 respectively differ, the scanning angle of the polygon mirror 81 differs for each of the partial light guide sections 84a to 84c. Accordingly, the quantity of the scanning light 63 incident on the light guide plate 85 can be adjusted for the respective partial light guide sections 84a to 84c by controlling the quantity of the scanning light 63 incident on the respective partial light guide sections 84a to 84c using the controller 20. For example, if the light quantity of the light source and the turning-on and turning-off of the light source are controlled according to the scanning speed and the scanning ranges, luminance on the principal surface of the light guide plate 85 can be made more uniform and loss of light by illuminating the outside of the scanning regions can be reduced.

In other words, in the planar lighting apparatus 80 according to the third embodiment, the scanning light 63 can be distributed in the direction orthogonal to the scanning direction by the respective mirror surfaces 83a to 83c of the polygon mirror 81 and the light quantity of the scanning light 63 in the respective light guide sections 84a to 84c can be adjusted in the scanning direction by the control of the controller 20. Therefore, a luminance adjustment on the principal surface of the light guide plate 85 can be two-dimensionally controlled.

A resin material frequently used to form the light guide plate 85 generally has high absorptance of blue laser light. As the screen becomes larger, the area of the light guide plate 85 also increases, with the result that the loss of blue laser light by absorption can be no longer ignored and color nonuniformity is caused due to differences from the absorption of red laser light and green laser light. However, since the propagation distance of the scanning light in the light guide plate can be shortened in the planar lighting apparatus 80, the absorption of the blue laser light is suppressed and the loss of the blue laser light and the color nonuniformity of the outgoing light from the light guide plate can be suppressed.

Although FIGS. 14 to 18 show the planar lighting apparatus 80 including the light guide plate 85 in which the three partial light guide sections 84a to 84c are arranged in a vertical direction perpendicular to the scanning direction of the scanning light, it is also possible to change the number of the partial light guide sections according to the screen size. In other words, four or more partial light guide sections may be arranged in the vertical direction for a large screen size and two partial light guide sections may be arranged for a relative small screen size.

A method using the respective mirror surfaces that are partial cylindrical surfaces or partial elliptic cylindrical surfaces having different curvatures as shown in FIG. 11 may be employed as a method for changing the scanning angle of the scanning light 63 to be incident on the respective partial light guide sections 84a to 84c.

The light guide plate 85 may also be such that three light guide plates having a light guide section and a connecting section similar to the first embodiment are arranged in a step-like manner.

(Fourth Embodiment)

Figure 19:
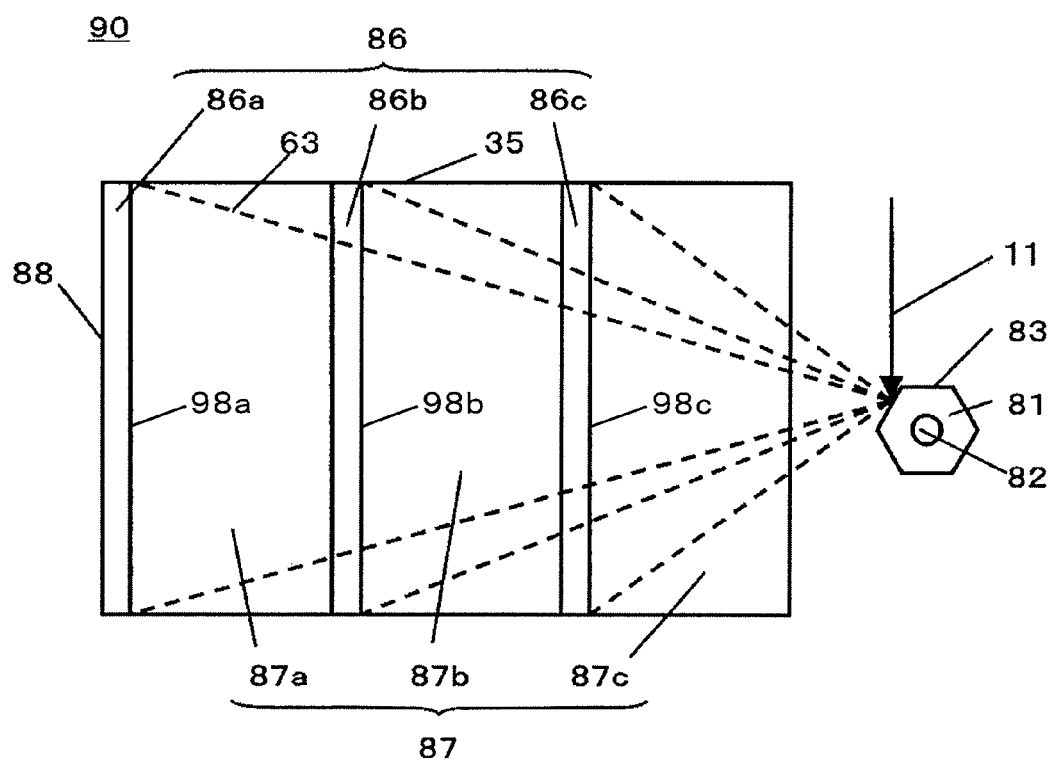
FIG. 19 is a schematic construction diagram of a planar lighting apparatus according to a fourth embodiment of the invention when a light guide plate is divided into three equal regions.
Figure 20:
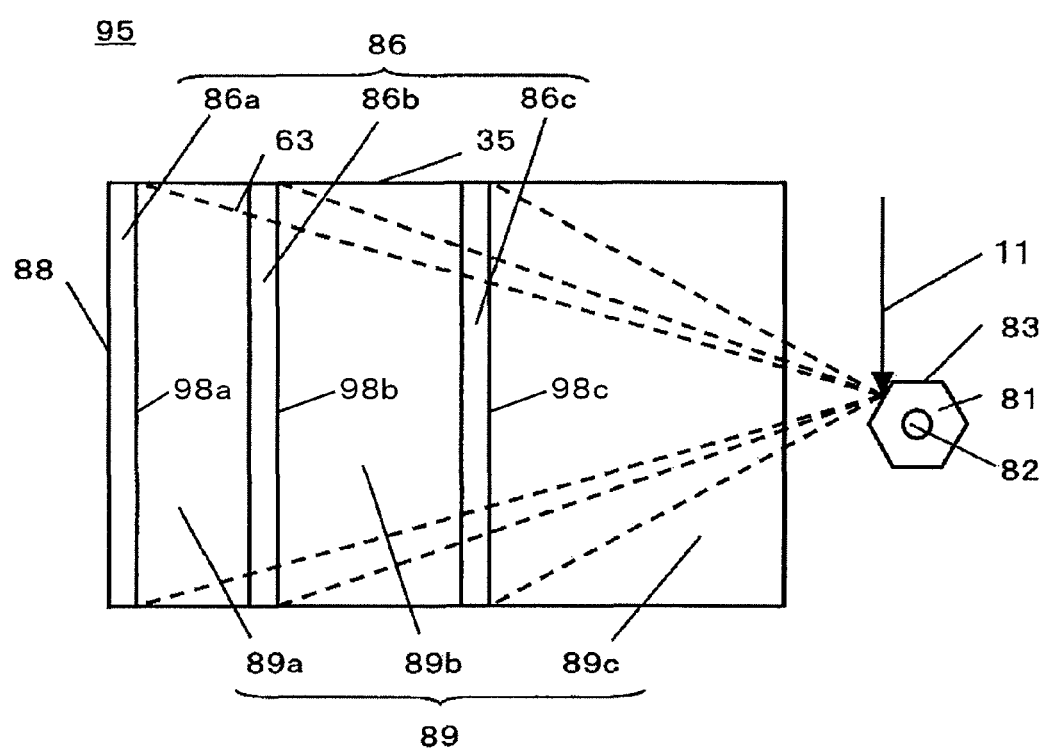
FIG. 20 is a schematic construction diagram of the planar lighting apparatus according to the fourth embodiment of the invention when the light guide plate is divided into three unequal regions.

FIGS. 19 and 20 are schematic construction diagrams showing planar lighting apparatuses 90, 95 according to a fourth embodiment of the present invention. FIG. 19 is the schematic construction diagram in the case where a light guide plate is divided into three equal emission regions and FIG. 20 is the schematic construction diagrams in the case where the light guide plate is divided into three unequal emission regions. In FIGS. 19 and 20, the construction (laser light source 12, dichroic mirrors 24, 25, driver 23, power supply 19) similar to the third embodiment is not shown.

As shown in FIG. 19, the planar lighting apparatus 90 is provided with a light guide plate 87 and a polygon minor 81. The polygon mirror 81 is similar to the one used in the third embodiment.

The light guide plate 87 includes three rows of partial light guide sections 86 projecting from the rear surface of the light guide plate 87 and extending in a direction orthogonal to a scanning direction by the polygon mirror 81. Unlike the third embodiment, the respective light guide sections 86 are a left light guide section 86a, a central light guide section 86b and a right light guide section 86c extending along shorter sides 88 of the light guide plate 87. The light guide plate 87 is divided into three equal emission regions, i.e. a left emission region 87a, a central emission region 87b and a right emission region 87c by the respective light guide sections 86a to 86c.

The partial light guide sections 86 are respectively formed with incident surfaces 98a to 98c, through which the scanning light is incident on the light guide plate 87. In other words, the left light guide section 86a is formed with the incident surface 98a, the central light guide section 86b is formed with the incident surface 98b and the right light guide section 86c is formed with the incident surface 98c.

Similar to the above third embodiment, a plurality of minor surfaces 83a to 83c of the polygon mirror 81 are formed such that the scanning light 63 is incident on the different partial light guide sections 86a to 86c.

In the planar lighting apparatus 90 thus constructed, the scanning light reflected by the respective minor surfaces of the polygon minor 81 is incident on the light guide plate 87 from the corresponding partial light guide sections 86a, 86b and 86c, and the incident scanning light (not shown) propagates in the light guide plate and is emitted from a principal surface (not shown).

By employing such a construction, luminance nonuniformity in the direction orthogonal to the scanning direction can be reduced and color nonuniformity can be eliminated by reducing the loss caused by the absorption of blue laser light similar to the third embodiment. In this case as well, if the light quantity of the light source and the turning-on and turning-off of the light source are controlled according to the scanning speed and the scanning ranges using the controller 20, luminance can be made uniform in the scanning direction. Specifically, if the respective mirror surfaces of the polygon mirror 81 are flat, the scanning speed becomes faster as the distance from the polygon minor 81 to the partial light guide section becomes longer, wherefore an effective scanning period is short in the left light guide section 86a and the instantaneously required scanning light quantity increases.

In the construction of FIG. 20, the emission region 89 is smaller as the distance from the polygon mirror to the partial light guide section is longer (so that left emission region 89a<central emission region 89b<right emission region 89c). The other construction and operation are similar to those of FIG. 19.

In this construction, if a control is executed to make a ratio of the scanning speed and the light quantity of the light source constant using the controller 20, the area of the partial emission region becomes smaller with distance from the polygon mirror 81, i.e. as the scanning speed increases. Thus, a maximum value of the scanning light quantity in relation to necessary luminance can be suppressed.

Therefore, according to the construction shown in FIG. 20, there is an effect of higher luminance than in the construction shown in FIG. 19 if a maximum rated output of the light source is the same, in addition to the effects by the construction shown in FIG. 19.

The planar lighting apparatus of this embodiment constructed as described above has an effect of eliminating color nonuniformity by reducing the loss caused by the absorption of blue laser light as well as an effect of reducing luminance nonuniformity in the scanning direction and the direction orthogonal to the scanning direction similar to the third embodiment.

Further, according to the above construction, the maximum value of the scanning light quantity can be suppressed while the luminance is made uniform by controlling the light quantity of the light source according to the scanning speed by the controller 20.

Although the planar lighting apparatus including the light guide plate in which the three partial light guide sections are arranged in a lateral direction perpendicular to the scanning direction of the scanning light is exemplified in FIGS. 19 and 20, the number of partial light guide sections may be changed according to the screen size. In other words, four or more partial light guide sections may be arranged in the lateral direction for a large screen size and two partial light guide sections may be arranged for a relative small screen size.

The method using the respective mirror surfaces that are partial cylindrical surfaces or partial elliptic cylindrical surfaces having different curvatures as shown in FIG. 11 may be employed as a method for changing the scanning angle of the scanning light 63 to be incident on the respective partial light guide sections 86a to 86c.

(Fifth Embodiment

Figure 21:
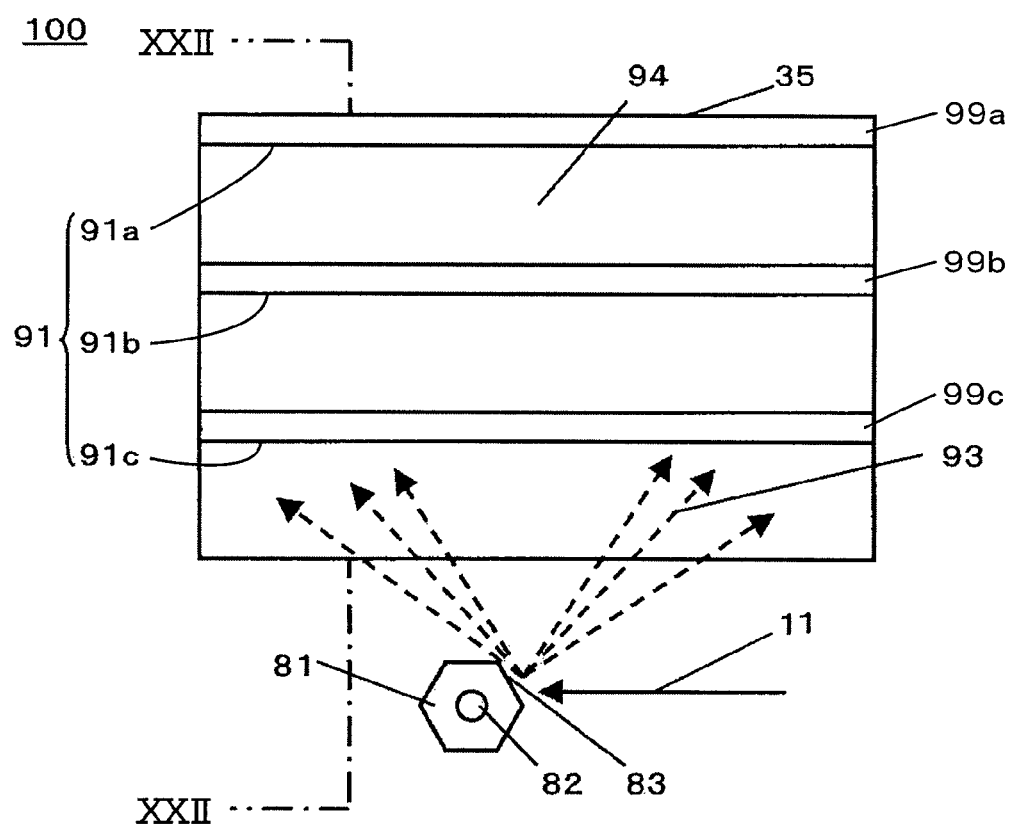
FIG. 21 is a schematic construction diagram showing a planar lighting apparatus according to a fifth embodiment of the invention when viewed from behind with a reflective mirror plate removed.
Figure 22:
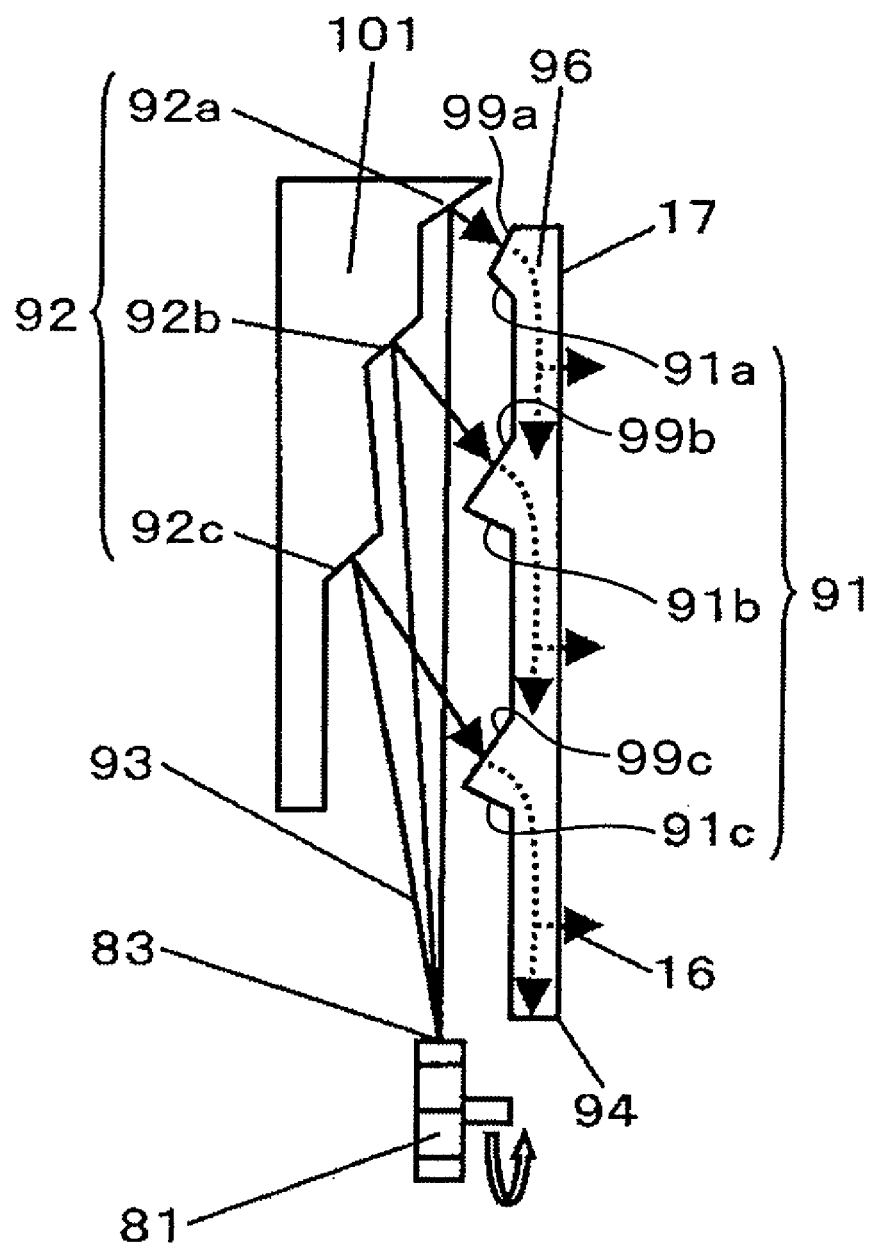
FIG. 22 is a section along XXII-XXII of FIG. 21.

FIGS. 21 and 22 are schematic construction diagrams showing a planar lighting apparatus 100 according to a fifth embodiment of the present invention. In FIGS. 21 and 22, the construction (laser light source 12, dichroic mirrors 24, 25, driver 23, power supply 19) similar to the third embodiment is not shown.

Unlike the third embodiment, the planar lighting apparatus 100 of this embodiment includes a reflective mirror plate 101. FIG. 21 is a schematic construction diagram of the planar lighting apparatus 100 when viewed from behind without the reflective mirror plate 101 being shown, and FIG. 22 is a section along XXII-XXII of FIG. 21.

As shown in FIG. 21, the planar lighting apparatus 100 is provided with a light guide plate 94, the reflective mirror plate 101 and a polygon mirror 81. The polygon mirror 81 used is similar to the one used in the third embodiment.

The light guide plate 94 includes three rows of partial light guide sections 91 projecting from the rear surface of the light guide plate 94 and arranged in a direction orthogonal to a scanning direction by the polygon mirror 81. The respective light guide sections 91 are an upper light guide section 91a, a central light guide section 91b and a lower light guide section 91c extending along longer sides 35 of the light guide plate 94.

The partial light guide sections 91 are respectively formed with incident surfaces 99a to 99c, through which the scanning light is incident on the light guide plate 94. In other words, the upper light guide section 91a is formed with the incident surface 99a, the central light guide section 91b is formed with the incident surface 99b and the right light guide section 91c is formed with the incident surface 99c.

Similar to the above third embodiment, a plurality of mirror surfaces 83a to 83c of the polygon mirror 81 are formed such that the scanning light 93 is incident on the different partial light guide sections 91a to 91c.

As shown in FIG. 22, the reflective mirror plate 101 includes reflecting mirrors 92a, 92b and 92c for reflecting the scanning light 93 introduced from the respective mirror surfaces 83a to 83c of the polygon mirror 81. The reflecting mirror 92a is formed to reflect the scanning light 93 toward the incident surface 99a of the upper light guide section 91a. The reflecting mirror 92b is formed to reflect the scanning light 93 toward the incident surface 99b of the central light guide section 91b. The reflecting mirror 92c is formed to reflect the scanning light 93 toward the incident surface 99c of the lower light guide section 91c.

In the planar lighting apparatus 100 thus constructed, the scanning light 93 reflected by the respective mirror surfaces of the polygon mirror 81 is reflected by the corresponding reflecting mirrors 92a, 92b and 92c. The scanning light 93 reflected by the reflecting mirror 92a is introduced to the upper light guide section 91a, the scanning light 93 reflected by the reflecting mirror 92b to the central light guide section 91b and the scanning light 93 reflected by the reflecting mirror 92c to the lower light guide section 91c to be incident on the light guide plate 94, whereby the scanning light 93 is incident on the light guide plate 94. Scanning light 96 incident on the light guide plate 94 is incident at such an angle to be totally reflected by a principal surface 17 of the light guide plate 94, propagates in the light guide plate 94 while being scattered or deflected and is emitted as outgoing light 16 from the principal surface 17.

The planar lighting apparatus of this embodiment constructed as above has effects of reducing luminance nonuniformity in the scanning direction and a direction orthogonal to the scanning direction and eliminating color nonuniformity by reducing the loss caused by the absorption of blue laser light similar to the third embodiment.

By providing the reflective mirror plate 101, the partial light guide sections 91 can be integral to the light guide plate 92, wherefore mass productivity is improved due to easier production.

Further, by elaborating the optical construction, optical path lengths from the polygon mirror 81 to the partial light guide sections 91a, 91b and 91c by way of the reflecting mirrors 92a, 92b and 92c can be aligned. In this way, average scanning speeds in the partial light guide sections 91a, 91b and 91c can be made equal even if the respective mirror surfaces of the polygon mirror 81 are flat. Therefore, a maximum value of the scanning light quantity in relation to necessary luminance can be suppressed.

It is also possible to set a common scanning angle of the polygon mirror 81 for the respective partial light guide sections 91. A specific construction for this purpose is shown in FIGS. 23 and 24.

Figure 23:
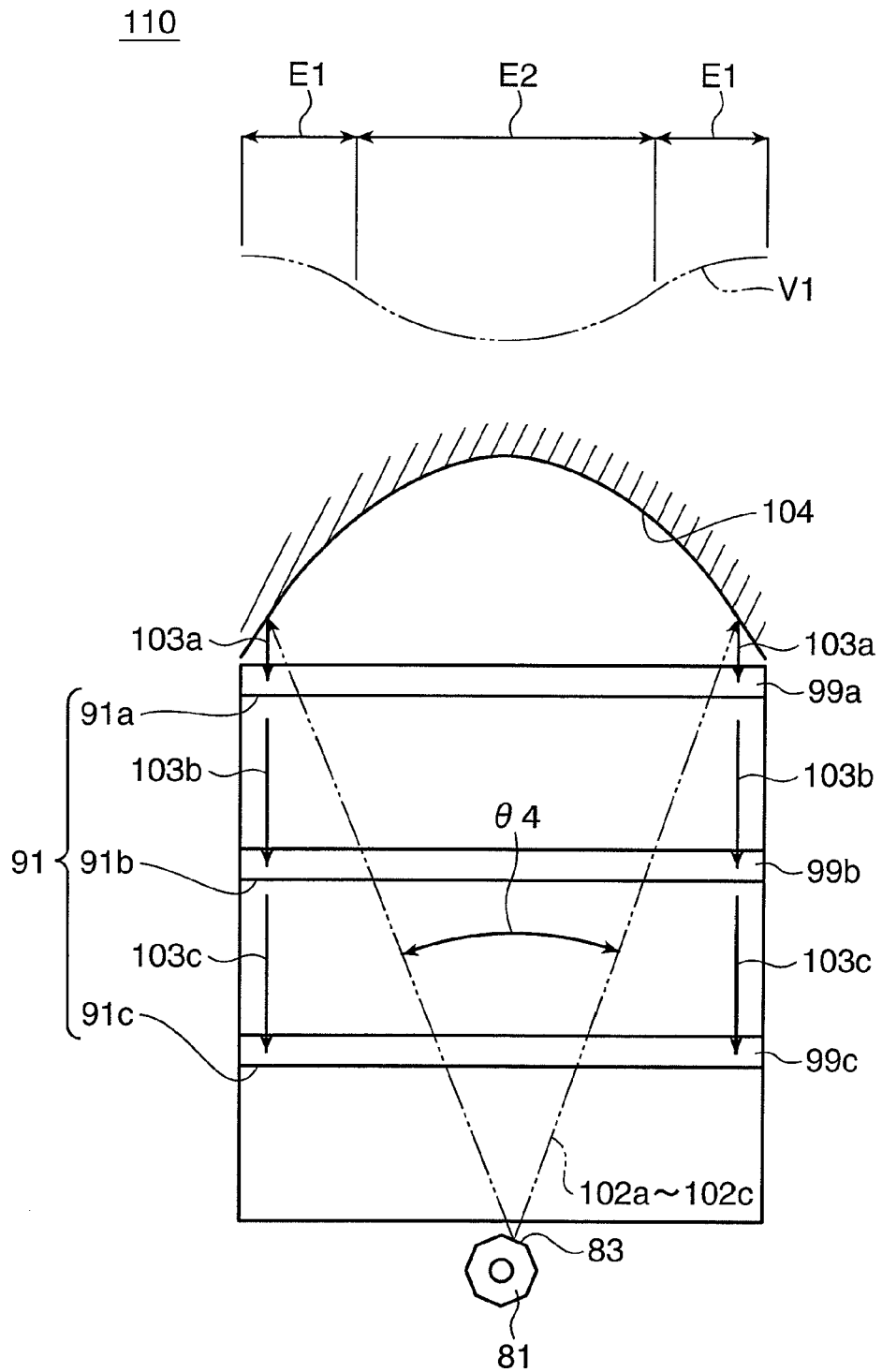
FIG. 23 is a schematic construction diagram showing a modification of the planar lighting apparatus according to the fifth embodiment of the invention.
Figure 24:
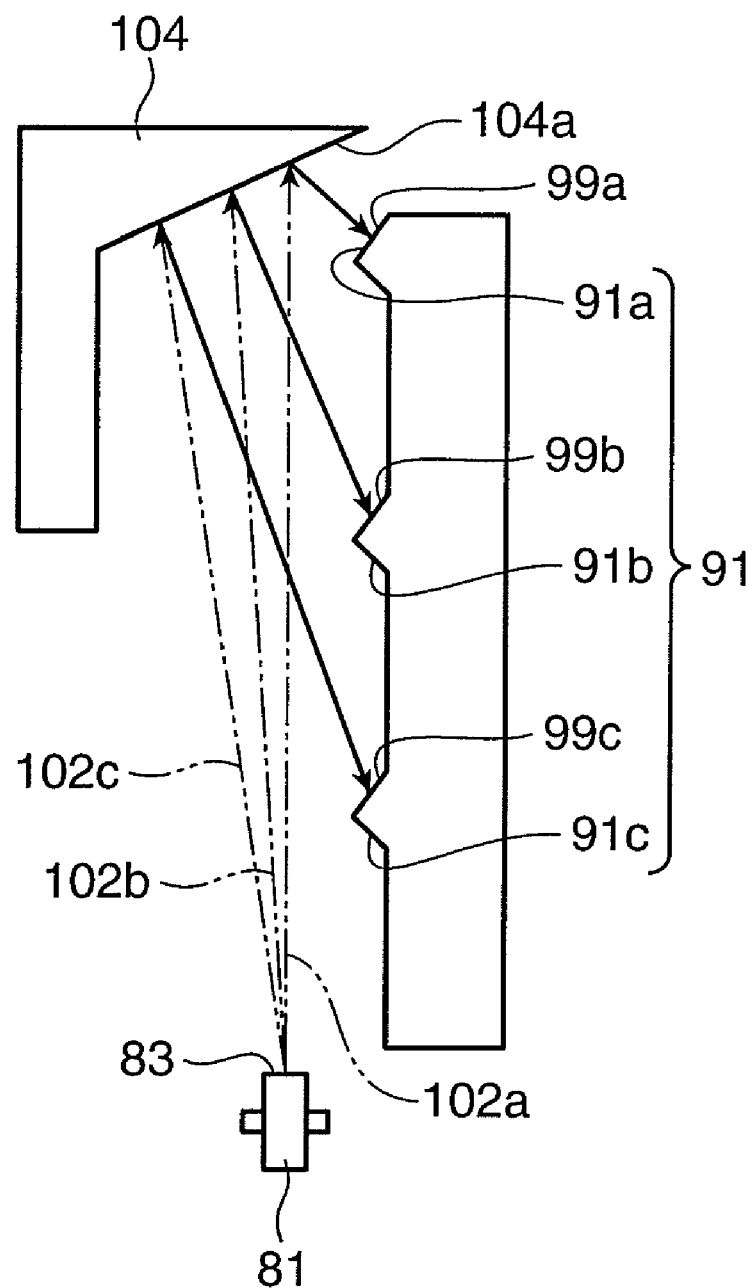
FIG. 24 is a side view of the modification of FIG. 23.

In the construction shown in FIGS. 23 and 24, a reflective mirror plate 104 is provided instead of the reflective mirror plate 101. The reflective mirror plate 104 is formed with a mirror surface 104a for reflecting scanning light 102a to 102c introduced from the polygon mirror 81 as parallel light 103a to 103c.

Specifically, as shown in FIG. 23, the mirror surface 104a is a surface whose cross section orthogonal to the rotary shaft of the polygon mirror 81 is parabolic. Thus, the scanning light 102a to 102c scanned at a common scanning angle θ4 are reflected as the parallel light 103a to 103c in lateral ranges corresponding to the respective partial light guide sections 91 by the mirror surface 104a. These parallel light 103a to 103c are incident on the incident surfaces 99a to 99c of the respective partial light guide sections 91a to 91c.

Accordingly, if the construction of FIGS. 23 and 24 is employed, the respective partial light guide sections 91 can be scanned at the common scanning angle θ4.

Although the scanning light 102 is reflected as the parallel light 103a to 103c over the entire scanning range in the reflective mirror plate 104, the reflective mirror plate 104 may have such a reflecting surface as to switch a range for reflecting as parallel light and a range for reflecting as divergent light according to the speed of the scanning light 102 with respect to the incident surfaces 99a to 99c.

Specifically, as shown by speed transition V1 of FIG. 23, the scanning speed of the scanning light 102 is faster in both end regions E1 of the scanning range while being slower in a central region E2 of the scanning range. Thus, it is possible to construct such a mirror as to reflect the scanning light as parallel light or convergent light in the both end regions E1 while reflecting it as divergent light in the central region E2. By doing so, a maximum value of the light quantity of the laser light required for scanning can be suppressed since a maximum value of the scanning speed of the scanning light 102 can be suppressed to low. By employing a Fresnel mirror, the mirror plate 104 can be so formed as not to largely bulge out from the outer shape of the light guide plate.

(Sixth Embodiment)

FIG. 25 schematically shows the entire construction of a planar lighting apparatus 120 according to a sixth embodiment.

The planar lighting apparatus 120 is provided with the laser light source 12 for irradiating laser light 11, the dichroic minors 24, 25, a scanning unit 123, a light guide plate 121 and the power supply 19 for the laser light source 12.

The light guide plate 121 includes a first light guide section 106a, a second light guide section 106a, a third light guide section 107a and a fourth light guide section 106a projecting from the rear surface of the light guide plate 121 and arranged in four rows placed one above another in a direction orthogonal to a scanning direction by a polygon minor 122. The light guide plate 121 is divided into four equal regions of a first emission region 105, a second emission region 106, a third emission region 107 and a fourth emission region 108 by the respective light guide sections 105a to 108a.

The partial light guide sections 105a to 108a are respectively formed with incident surfaces (not shown), through which scanning light is incident on the light guide plate 121. Each of these partial light guide sections 105a to 108a is divided into four scanning regions R, S, T and U. In this embodiment, these scanning regions R, S, T and U are set as scanning regions having an equal lateral dimension.

The scanning unit 123 includes the polygon mirror 122 and the driver 23 for driving the polygon mirror 122. The polygon mirror 122 has eight minor surfaces which are outer side surfaces of an octagonal prism.

As shown in FIGS. 15 to 18, these minor surfaces are formed to have different angles with respect to the rotary shaft. In this embodiment, two each of the eight mirrors of the polygon mirror 122 are set to have the same angle of inclination. Specifically, two of the mirror surfaces are set at such an angle of inclination as to be able to reflect the laser light 11 toward the incident surface of the first light guide plate 105a. Other two mirror surfaces are set at such an angle of inclination as to be able to reflect the laser light 11 toward the incident surface of the second light guide plate 106a. Still other two mirror surfaces are set at such an angle of inclination as to be able to reflect the laser light 11 toward the incident surface of the third light guide plate 107a. The remaining two mirror surfaces are set at such an angle of inclination as to be able to reflect the laser light 11 toward the incident surface of the fourth light guide plate 108a. Thus, by rotating the polygon mirror 122 by 360°, the respective first to fourth light guide sections 105a to 108a can be scanned twice.

In this embodiment, the controller 20 can control the light quantity of the scanning light scanned by the polygon mirror 122 for each scanning region. In other words, the controller 20 controls the light quantity of the scanning light for each of sixteen regions of the light guide plate 121 divided by the respective emission regions 105 to 108 and the respective scanning regions R to U.

Accordingly, in the case of using the planar lighting apparatus 120 as an image display device as shown in FIGS. 7 and 8, it is possible to finely adjust luminance for each of the sixteen divided regions of the light guide plate 121, i.e. to perform an area control according to luminance information of each region of a video image displayed on a liquid crystal panel. Thus, as compared with the case where the light guide plate 121 is constantly entirely made luminous, power consumption can be drastically reduced.

The liquid crystal display device as shown in FIGS. 7 and 8 in the first embodiment can be constructed using the planar lighting apparatus shown in any one of the second to sixth embodiments as a backlight illumination apparatus. By employing such a construction, a liquid crystal display device can be realized which has good color reproducibility, high luminance and little luminance nonuniformity even when having a large screen. Further, it is also possible to realize a thin liquid crystal display device by elaborating the optical construction.

The above specific embodiments mainly embrace inventions having the following constructions.

In order to accomplish the above object, a planar lighting apparatus according to one aspect of the present invention comprises a laser light source for emitting laser light; a light guide plate having an incident surface on which the laser light is to be incident and a principal surface from which the laser light incident on the incident surface is emitted; a scanning unit for scanning the incident surface with the laser light emitted from the laser light source; and a controller for controlling the laser light source, wherein the controller controls the light quantity of the laser light scanning the incident surface such that the ongoing light from the principal surface forms a specified luminance distribution in a scanning direction of the laser light by the scanning unit.

According to this construction, the planar lighting apparatus can be realized which can output the laser light with high luminance and free from luminance nonuniformity in the scanning direction of the laser light and with the specified luminance distribution in the scanning direction. Further, if an optical path of the laser light introduced from the laser light source to the incident surface via the scanning unit is provided in a space on the rear surface of the light guide plate, it is possible to realize a thin and light planar lighting apparatus.

In the above planar lighting apparatus, the controller preferably controls the light quantity of the laser light such that a ratio of the light quantity of the laser light scanning the incident surface and scanning speed is kept constant.

According to this construction, the luminance distribution of the light guide plate can be made uniform in the scanning direction since the light quantity of the laser light per unit area in the scanning direction can be made constant.

In the above planar lighting apparatus, the scanning unit preferably includes a polygon mirror having a plurality of mirror surfaces and a driver for drivingly rotating the polygon mirror.

According to this construction, the scanning of the incident surface with the laser light can be realized by a simple construction. Further, if the optical path of the laser light introduced from the laser light source to the incident surface via the scanning unit is provided in the space on the rear surface of the light guide plate, it is possible to realize a thin and light planar lighting apparatus by using the polygon mirror as the scanning unit.

In the above planar lighting apparatus, it is preferable that the light guide plate has a plurality of rows of incident surfaces arranged in a direction orthogonal to the scanning direction; that each mirror surface of the polygon mirror is formed to scan one row of the incident surface out of the respective incident surfaces with the laser light; and that all the rows of the incident surfaces are scanned by the laser light reflected by all of the respective mirror surfaces.

According to this construction, the plurality of rows of the incident surfaces can be scanned with the laser light using one polygon mirror since the row of the incident surface to be scanned can be changed for each mirror surface of the polygon mirror.

In the above planar lighting apparatus, the respective mirror surfaces of the polygon mirror are preferably adjusted to be at angles different for the respective rows of the incident surfaces to be scanned with respect to a rotary shaft of the polygon minor.

According to this construction, the laser light can be introduced to the incident surface in the row corresponding to the angle of each minor surface of the polygon mirror even if an irradiation angle of the laser light to the polygon mirror is hardly changed for the respective rows of the incident surfaces. Thus, the planar lighting apparatus can be more easily manufactured since the plurality of rows of the incident surfaces can be scanned using the simply constructed polygon mirror.

In the above planar lighting apparatus, it is preferable that each incident surface is divided into a plurality of scanning regions arranged in the scanning direction; and that the controller controls the light quantity of the laser light scanning the incident surface for each scanning region.

According to this construction, the luminance distribution can be adjusted for each of the regions of the principal surface of the light guide plate divided by a number which is the product of the number of the rows of the incident surfaces and the number of the scanning regions since the light quantity of the laser light scanning each incident surface can be controlled for each scanning region. Thus, in the case of using the planar lighting apparatus having this construction to illuminate a liquid crystal panel or the like, it is possible to adjust a luminance distribution of the liquid crystal panel for regions corresponding to the scanning regions according to an image to be displayed, i.e. to execute a so-called area control.

In the above planar lighting apparatus, it is preferable that the light guide plate is formed with a plurality of rows of partial light guide sections projecting from the rear surface opposite to the principal surface and arranged in a direction orthogonal to the scanning direction; and that the respective incident surfaces are provided on the corresponding partial light guide sections.

According to this construction, since the respective incident surfaces are formed on the plurality of partial light guide sections formed on the rear surface of the light guide plate, an optical path of the laser light propagating in the light guide plate can be shortened and luminance nonuniformity in the direction orthogonal to the scanning direction can be reduced as compared with the case where the laser light is incident on an end surface of the light guide plate. Blue laser light has a property of being easily absorbed by the material of the light guide plate. Since the optical path of the laser light propagating in the light guide plate can be shortened according to the above construction, it is possible to suppress the absorption of the blue laser light by the light guide plate and suppress the color nonuniformity of the outgoing light from the light guide plate.

The partial light guide sections may be arranged either along longer sides or along shorter sides of the light guide plate according to the scanning direction of the laser light.

Regardless of whether the partial light guide sections are arranged along the shorter sides or longer sides of the light guide plate, the optical path of the laser light propagating in the light guide plate can be shortened as compared with the case where the laser light is incident on the end surface of the light guide plate. Thus, luminance nonuniformity in the direction orthogonal to the scanning direction can be reduced. Further, regardless of whether the partial light guide sections are arranged along the shorter sides or longer sides of the light guide plate, the optical path of the laser light propagating in the light guide plate can be shortened, wherefore it is possible to suppress the absorption of the blue laser light by the light guide plate and suppress the color nonuniformity of the outgoing light from the light guide plate.

In the above planar lighting apparatus, it is preferable that the principal surface of the light guide plate is divided into a plurality of rows of emission regions arranged in the direction orthogonal to the scanning direction in conformity with the respective rows of the incident surfaces; that each emission region is so formed as to emit the laser light incident on the corresponding incident surface; and that the area of each emission region decreases as a distance between the incident surface corresponding to the emission region and the polygon mirror increases.

According to this construction, differences in the light quantity of the laser light per unit area in the respective emission regions can be made smaller. In other words, as the distance between the incident surface and the polygon mirror increases, a scanning angle by the polygon mirror becomes smaller to reduce the light quantity of the laser light that can be incident on the incident surface. However, since the area of each emission region decreases as the distance between the incident surface and the polygon mirror increases in the above construction, the light quantity of the laser light per unit area can be substantially equal in the respective emission regions. Thus, in the case of executing a control to keep the ratio of the scanning speed and the light quantity of the light source constant using the above construction, it is not necessary to increase the light quantity of the laser light scanning the distant incident surface even if the scanning speed of the polygon mirror is increased. Therefore, a light source with a low rated output can be used.

In the above planar lighting apparatus, a reflecting plate may be further provided to reflect the laser light introduced from the scanning unit toward the respective incident surfaces.

According to this construction, the incident surfaces can be scanned with the laser light via the reflecting plate.

In the above planar lighting apparatus, the reflecting plate has a reflecting surface which can reflect the laser light introduced from the scanning unit as parallel light toward the respective rows of the incident surfaces.

According to this construction, the light quantity per scanning can be made equal for the respective incident surfaces since the scanning angles with respect to the respective incident surfaces can be made equal.

In the above planar lighting apparatus, the scanning unit may include a galvanometer mirror and a driver for driving the galvanometer mirror.

According to this construction, the scanning of each incident surface with the laser light can be realized by a simple construction. Further, if the optical path of the laser light introduced from the laser light source to each incident surface via the scanning unit is provided in the space on the rear surface of the light guide plate, it is possible to realize a thin and light planar lighting apparatus by using the galvanometer mirror as the scanning unit.

A planar lighting apparatus according to one aspect of the present invention comprises a laser light source for emitting laser light; a light guide plate having an incident surface on which the laser light is to be incident and a principal surface from which the laser light incident on the incident surface is emitted; and a scanning unit for scanning the incident surface with the laser light emitted from the laser light source, wherein the scanning unit includes a polygon mirror having a plurality of mirror surfaces and a driver for driving the polygon mirror; the incident surface is divided beforehand by a plurality of scanning regions arranged in a scanning direction of the laser light by the scanning unit; and each mirror of the polygon mirror scans any one of the respective scanning regions with the laser light.

According to the present invention, speed variation among the respective scanning regions can be made smaller since the scanning angles of the respective mirror surfaces of the polygon mirror can be made smaller. As a result, the light quantity of the laser light irradiated to the entire incident surface can also be made uniform in the scanning direction. Therefore, according to the above construction, luminance nonuniformity in the scanning direction on the principal surface of the light guide plate can be suppressed.

In the above planar lighting apparatus, the polygon mirror has a polygonal shape with a nearly elliptic cross section orthogonal to a rotary shaft thereof.

According to this construction, the incident surface can be divided into smaller scanning regions since the number of the mirror surfaces can be increased while the areas of the respective mirror surfaces are made different. Further, scanning speed variation among the respective scanning regions can be more finely adjusted since the scanning angle of one mirror surface can be made smaller than those of the other mirror surfaces.

In the above planar lighting apparatus, at least one of the plurality of mirror surfaces is preferably a partial cylindrical surface or a partial elliptic cylindrical surface.

According to this construction, by forming the mirror surface by the partial cylindrical or elliptic cylindrical surface, the scanning angle of the minor surface can be made smaller as compared with the case where the mirror surface is flat. Thus, a desired scanning angle can be set by suitably setting a radius of curvature of the partial cylindrical or elliptic cylindrical surface.

In the above planar lighting apparatus, it is preferable that a controller for controlling the laser light source is further provided; and that the controller controls the light quantity of the laser light such that the scanning light quantity of the laser light scanning the scanning regions is uniform among the respective scanning regions.

According to this construction, luminance nonuniformity in the scanning direction on the principal surface of the light guide plate can be further suppressed since the variation of the scanning light quantity of the laser light among the respective scanning regions can be made smaller.

In the above planar lighting apparatus, it is preferable that the polygon mirror includes a mirror main body having the respective mirror surfaces and a rotary shaft supporting the mirror main body; and that the rotary shaft is provided at a center of gravity position of the mirror main body.

According to this construction, the mirror main body can be stably rotated at a high speed.

In the above planar lighting apparatus, it is preferable that the light guide plate includes a plate main body, a light guide section arranged at a rear surface side of the light guide plate and a connecting section for optically connecting the plate main body and the light guide section; and that the incident surface is formed on the light guide section.

According to this construction, scanning light can be efficiently introduced to the light guide plate since an optical path of the laser light from the scanning unit or the polygon mirror to the incident surface can be arranged at the rear surface side of the light guide plate.

In the above planar lighting apparatus, it is preferable that the laser light source includes light sources for emitting red light, green light and blue light; and that the laser light emitted from each light source is introduced to the incident surface via the same optical path.

According to this construction, a planar lighting apparatus capable of realizing a display with high luminance and a wide color reproduction range can be constructed using a simple optical system.

In order to the above object, a liquid crystal display device according to one aspect of the present invention comprises a liquid crystal display panel and the above planar lighting apparatus, wherein the planar lighting apparatus is used as a backlight illumination apparatus for illuminating the liquid crystal display panel from behind.

According to this construction, a liquid crystal display device can be realized which can display R, G and B light with high luminance, without luminance nonuniformity and with a specified luminance distribution in a scanning direction of scanning light. If an optical path of the laser light introduced from the laser light source to the incident surface is provided in a space on the rear surface of the light guide plate, it is possible to realize a thin and light liquid crystal display device.

In the above liquid crystal display device, the laser light source of the planar lighting apparatus preferably includes light sources for respectively emitting red light, green light and blue light.

According to this construction, a liquid crystal display device with high luminance and a wide color reproduction range can be realized.

Since the planar lighting apparatus according to one aspect of the present invention uses the laser light source with high luminance and strong monochromaticity, R, G and B light can be displayed with high luminance and suppressed luminance nonuniformity in the scanning direction of the scanning light.

Further, the liquid crystal display device using this planar lighting apparatus as a backlight illumination apparatus can be utilized as a thin display device with a wide color reproduction range, a large area and high luminance. According to the planar lighting apparatus or the liquid crystal display device according to the one aspect of the present invention, the luminance nonuniformity of laser light emitted from the principal surface can be reduced even if the principal surface of the light guide plate has a large area.

Industrial Applicability

Since a planar lighting apparatus according to the present invention and a liquid crystal display device using the same use a laser light source with a wide color reproduction range, they have high luminance, are free from luminance nonuniformity, can be thinned and are useful in the field of displays such as large-size displays and high-luminance displays even if they are used in a large-size display device.

What is claimed is:

1. A planar lighting apparatus, comprising:
a laser light source for emitting a laser light;
a light guide plate having an incident surface on which the laser light is to be incident and a principal surface from which the laser light, which is incident on the incident surface, is emitted;
a scanning unit for scanning the incident surface of the light guide plate with the laser light emitted from the laser light source; and
a controller for controlling the laser light source,
wherein the controller controls a light quantity of the laser light scanning the incident surface of the light guide plate, such that an ongoing light emitted from the principal surface forms a specified luminance distribution in a scanning direction of the laser light by the scanning unit, wherein the scanning unit includes a polygon mirror having a plurality of mirror surfaces and includes a driver for drivingly rotating the polygon mirror, wherein the incident surface of the light guide plate includes a plurality of incident surfaces formed in rows, so as to form a plurality of rows of the incident surfaces arranged in a direction orthogonal to the scanning direction of the scanning unit, wherein each mirror surface of the plurality of mirror surfaces of the polygon mirror is formed to scan, with the laser light, one respective row of the plurality of rows of the incident surfaces, wherein all rows of the plurality of rows of the incident surfaces are scanned by the laser light reflected by all respective mirror surfaces of the plurality of mirror surfaces of the polygon mirror, wherein the principal surface of the light guide plate is divided into a plurality of rows of emission regions arranged in the direction orthogonal to the scanning direction of the scanning unit in conformity with respective rows of the incident surfaces of the plurality of rows of the incident surfaces, wherein each emission region of the plurality of rows of the emission regions is formed to emit the laser light incident on a corresponding incident surface of the plurality of rows of the incident surfaces, and wherein the controller two-dimensionally controls a luminance adjustment on the principal surface of the light guide plate by adjusting the quantity of the laser light incident on the light guide plate for respective rows of the plurality of rows of the incident surfaces.

2. The planar lighting apparatus according to claim 1, wherein the controller controls the light quantity of the laser light such that a ratio of the light quantity of the laser light scanning the incident surface and a scanning speed remains constant.

3. The planar lighting apparatus according to claim 1, wherein respective mirror surfaces of the plurality of mirror surfaces of the polygon mirror are adjusted to be at angles different for respective rows of the plurality of rows of the incident surfaces to be scanned with respect to a rotary shaft of the polygon mirror.

4. The planar lighting apparatus according to claim 1, wherein each incident surface of the plurality of rows of the incident surfaces is divided into a plurality of scanning regions arranged in the scanning direction of the scanning unit, and wherein the controller controls the light quantity of the laser light scanning each scanning region of the plurality of scanning regions of the incident surfaces of the plurality of rows of the incident surfaces.

5. The planar lighting apparatus according to claim 1, wherein the light guide plate is formed with a plurality of rows of partial light guide sections projecting from a rear surface opposite to the principal surface and arranged in a direction orthogonal to the scanning direction of the scanning unit, and wherein respective incident surfaces of the plurality of rows of the incident surfaces are provided on corresponding partial light guide sections of the plurality of rows of the partial light guide sections.

6. The planar lighting apparatus according to claim 1, wherein an area of each respective emission region of the plurality of rows of the emission regions decreases as a distance between an incident surface, of the plurality of rows of the incident surfaces, corresponding to the respective emission region and the polygon mirror increases.

7. The planar lighting apparatus according to claim 1, further comprising a reflecting plate for reflecting the laser light introduced from the scanning unit toward respective incident surfaces of the plurality of rows of the incident surfaces.

8. The planar lighting apparatus according to claim 7, wherein the reflecting plate has a reflecting surface which can reflect the laser light introduced from the scanning unit as parallel light toward respective rows of the plurality of rows of the incident surfaces.

9. The planar lighting apparatus according to claim 1, wherein the scanning unit includes a galvanometer mirror and a driver for driving the galvanometer mirror.

10. The planar lighting apparatus according to claim 1, wherein the light guide plate includes a plate main body, a light guide section arranged at a rear surface side of the light guide plate and a connecting section for optically connecting the plate main body and the light guide section, and wherein each incident surface of the plurality of rows of the incident surfaces is formed on the light guide section.

11. The planar lighting apparatus according to claim 1, wherein the laser light source includes a plurality of light sources for emitting a red light, a green light and a blue light, and wherein the laser light emitted from each light source of the light sources is introduced to an incident surface, of the plurality of rows of the incident surfaces, via a same optical path.

12. A liquid crystal display device, comprising:
a liquid crystal display panel; and
the planar lighting apparatus according to claim 1,
wherein the planar lighting apparatus is used as a backlight illumination apparatus for illuminating the liquid crystal display panel from behind.

13. The liquid crystal display device according to claim 12, wherein the laser light source of the planar lighting apparatus includes light sources for respectively emitting a red light, a green light and a blue light.

* * * * *